US011768661B2

(12) United States Patent
Yazdanshenas et al.

(10) Patent No.: US 11,768,661 B2
(45) Date of Patent: Sep. 26, 2023

(54) EFFICIENT LOGIC BLOCKS ARCHITECTURES FOR DENSE MAPPING OF MULTIPLIERS

(71) Applicant: Intel Corporation, Santa Clara, CA (US)

(72) Inventors: Sadegh Yazdanshenas, Toronto (CA); Tim Vanderhoek, East York (CA)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 16/729,256

(22) Filed: Dec. 27, 2019

(65) Prior Publication Data
US 2021/0200514 A1 Jul. 1, 2021

(51) Int. Cl.
*G06F 7/523* (2006.01)
*G06F 1/03* (2006.01)

(52) U.S. Cl.
CPC .............. *G06F 7/523* (2013.01); *G06F 1/03* (2013.01)

(58) Field of Classification Search
CPC .................... G06F 7/523–5338; G06F 1/03
See application file for complete search history.

(56) References Cited

U.S. PATENT DOCUMENTS 5,436,860 A * 7/1995 Shankar ............... G06F 5/015
                                                              708/620
2019/0288688 A1  9/2019 Gribok et al.

OTHER PUBLICATIONS

Walters on "Array Multipliers for High Throughput in Xilinx FPGAs with 6-Input LUTs", Computers 2016, 5(4), 20; https://doi.org/10.3390/computers5040020 (Year: 2016).*
Boutros et al., "Math Doesn't Have to be Hard: Logic Block Architectures to Enhance Low-Precision Multiply-Accumulate on FPGAs," FPGA '19, Feb. 24-26, 2019, Seaside, California.
Kim et al., "FPGA Architecture Enhancements for Efficient BNN Implementation," 2019 International Conference on Field-Programmable Technology (FPT), Dec. 10, 2018.
Extended European Search Report for EP Application No. 20196378.2 dated Mar. 4, 2021.

* cited by examiner

*Primary Examiner* — Emily E Larocque
*Assistant Examiner* — Carlo Waje
(74) *Attorney, Agent, or Firm* — Fletcher Yoder, P.C.

(57) ABSTRACT

An integrated circuit includes a logic block configured to perform multiplication operations. The logic block includes a plurality of lookup tables configured to receive a plurality of inputs and generate a first plurality of outputs. Additionally, the logic block includes adding circuitry configured to receive the first plurality of outputs and generate a second plurality of outputs. Furthermore, the logic block includes circuitry configured to receive a portion of the plurality of inputs, determine one or more partial products, and generate a third plurality of outputs.

20 Claims, 50 Drawing Sheets

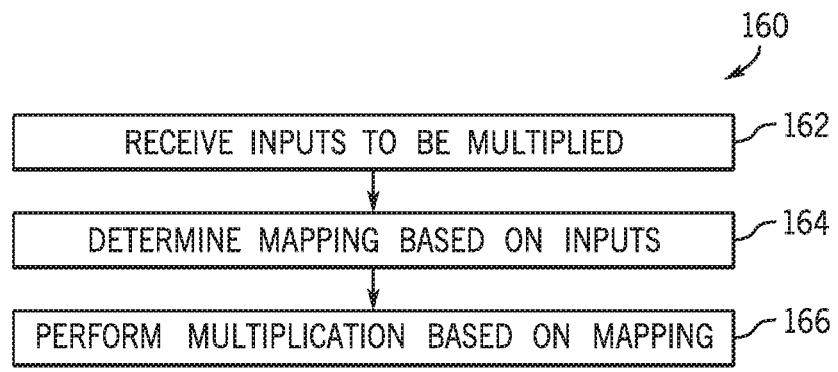
FIG. 6
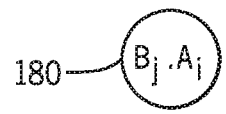
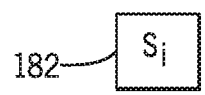
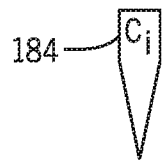
FIG. 7

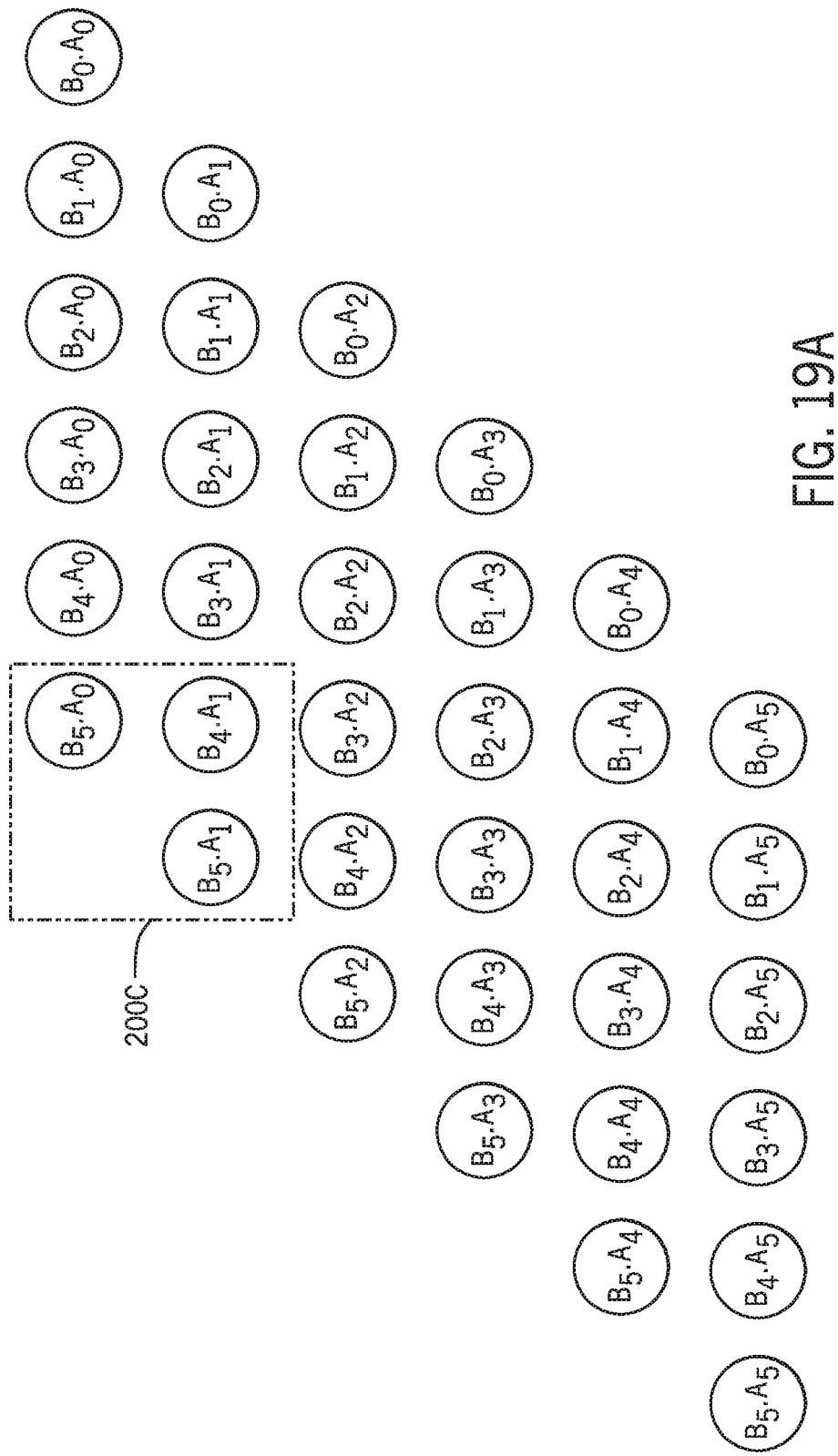

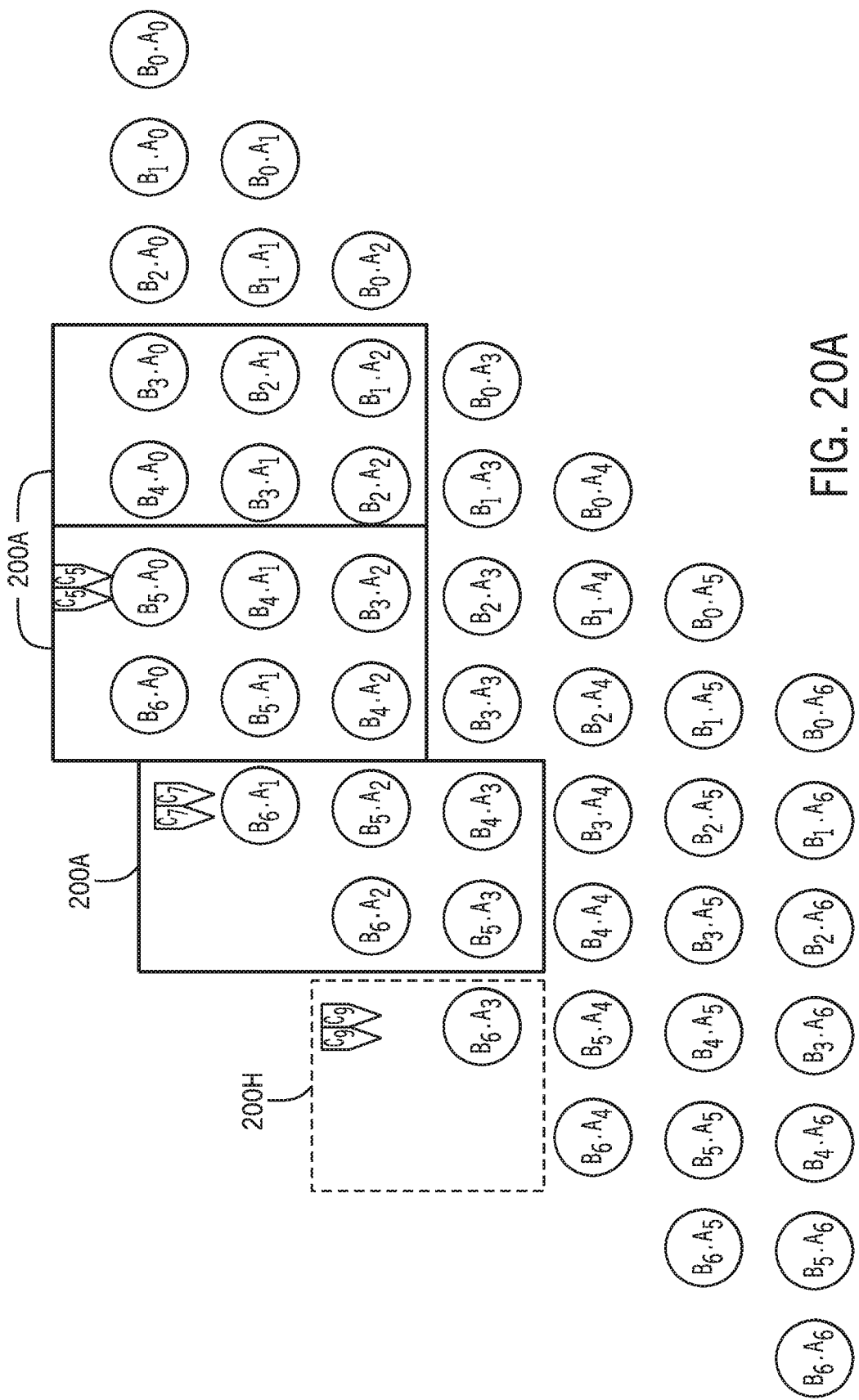

EFFICIENT LOGIC BLOCKS ARCHITECTURES FOR DENSE MAPPING OF MULTIPLIERS

BACKGROUND

This disclosure generally relates to integrated circuits, such as field-programmable gate arrays (FPGAs). More particularly, the present disclosure relates to performing mathematical operations, such as multiplication, implemented using circuitry elements of an integrated circuit (e.g., programmable logic of an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits increasingly carry out functions such as encryption and machine leaning. Encryption and machine learning, as well as many other operations that may take place on integrated circuitry, may utilize multiplier circuitry (e.g., multipliers). For example, multiplier may be programmed onto logic of an integrated circuit and utilized to determine products of numbers being multiplied. However, more multiplier circuitry may be used than desired in some instances, which can result in a limited number of multiplication operations being performed. For instance, when too many logic blocks may be used to perform multiplication, the resources of the integrated circuitry may be inefficiently used, and the integrated circuitry may not be able to perform a desired number of multiplication operations. Moreover, multiplication operations may take more than desired to perform.

BRIEF DESCRIPTION OF THE DRAWINGS

Various aspects of this disclosure may be better understood upon reading the following detailed description and upon reference to the drawings in which:

FIG. 6 is a flow diagram of a process for carrying out multiplication operations, in accordance with an embodiment;

FIG. 7 illustrated symbols used to discuss multiplication operations discussed herein, in accordance with an embodiment;

FIG. 19A is a illustrates a first stage of mapping of a 6×6 multiplication operation, in accordance with an embodiment;

FIG. 20A is a illustrates a first stage of mapping of a 7×7 multiplication operation, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Integrated circuits, such as programmable logic devices, may be utilized to perform mathematical operations, such as addition and multiplication. For example, logic (e.g., reconfigurable logic) on programmable logic devices can be programmed to perform the mathematical operations. For instance, programmed logic utilized to perform multiplication can be referred to as a "multiplier." Logic blocks, which may include particular circuit elements (e.g., look-up tables, adders, multiplexers, etc.) may be utilized to perform multiplication. In some cases, the amount of logic blocks of the programmable logic device used to perform multiplication may be undesirably large, which may reduce the amount of the programmable logic device that is available to be programmed (e.g., to perform other functions). The present application is generally directed to more efficient techniques for performing multiplication on programmable logic devices such as, but not limited to, field programmable gate arrays (FPGAs). For example, as discussed below, various architectures for logic blocks are provided that enable fewer logic blocks to be utilized to perform multiplication operations, thereby enabling more multiplication operations to be performed on programmable logic devices.

Figure 1:
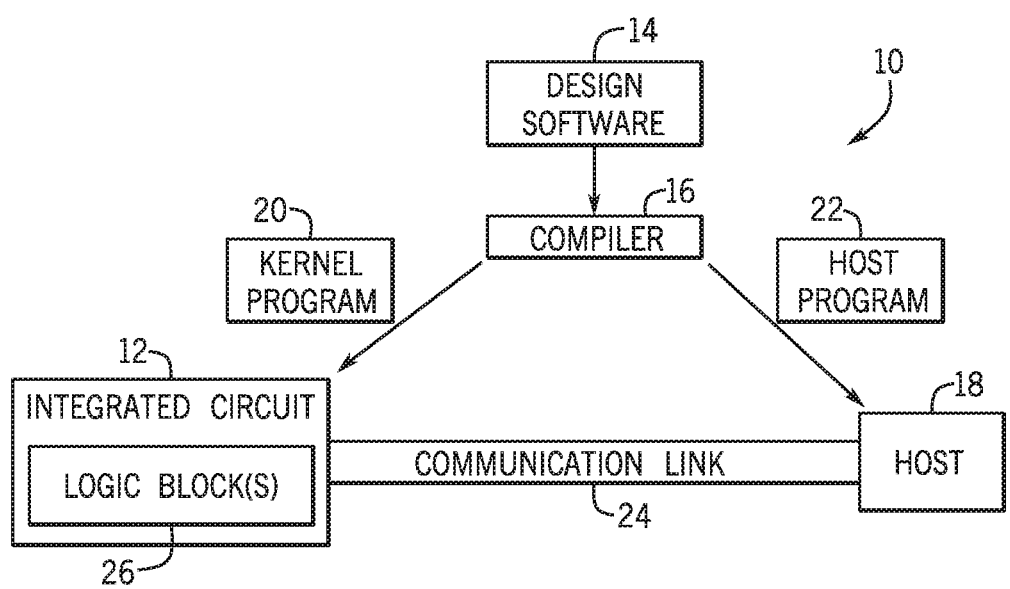
FIG. 1 is a block diagram of a system for implementing arithmetic operations, in accordance with an embodiment.

With the foregoing in mind, FIG. 1 illustrates a block diagram of a system 10 that may implement arithmetic operations. A designer may desire to implement functionality, such as the arithmetic operations of this disclosure, on an integrated circuit device 12 (e.g., a programmable logic device such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit device 12. The logic block 26 may include circuitry and/or other logic elements and may be configured to implement arithmetic operations, such as addition and multiplication.

While the techniques described herein relate to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
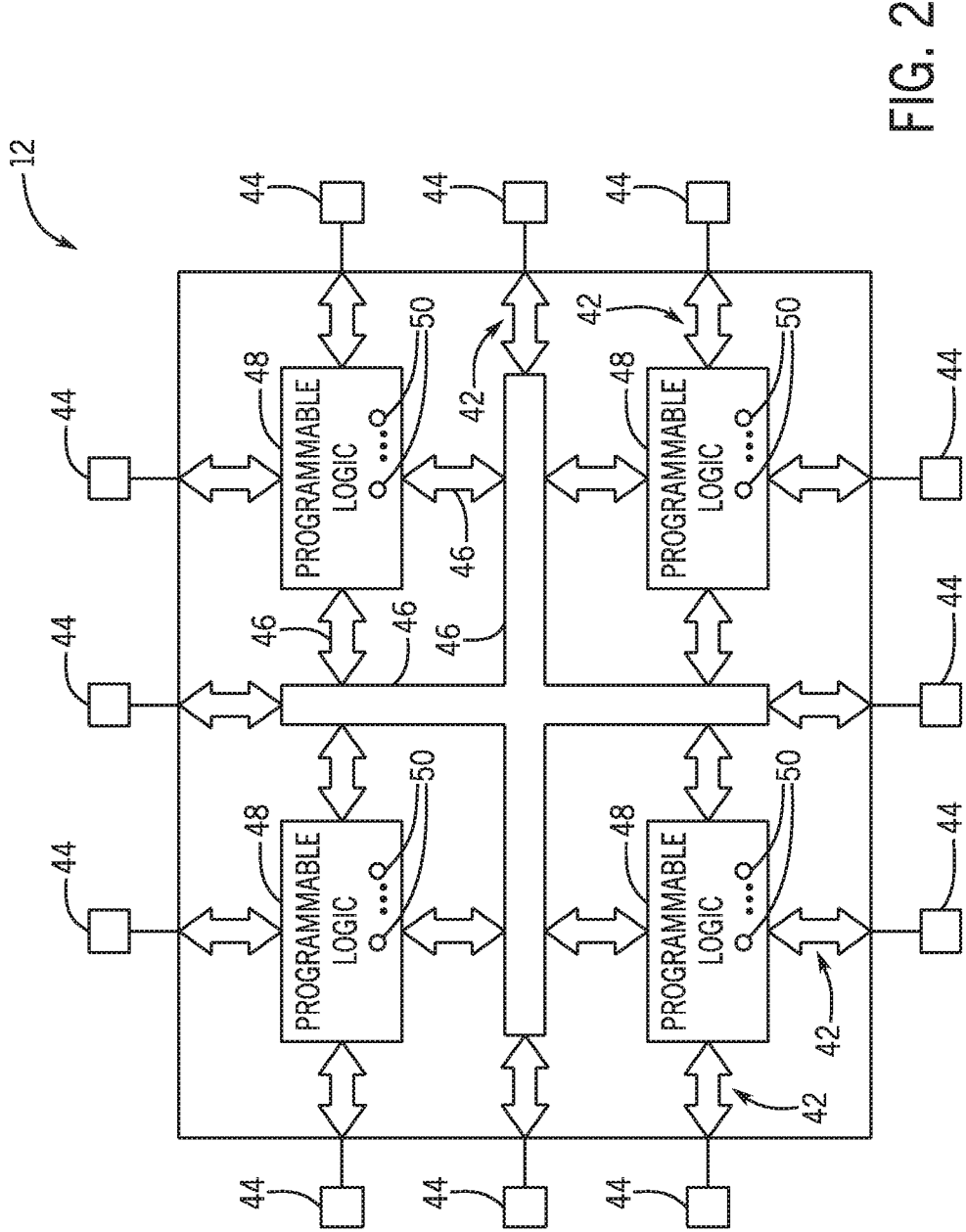
FIG. 2 is a block diagram of an integrated circuit in which addition circuitry may be implemented, in accordance with an embodiment.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of programmable logic device (e.g., an ASIC and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
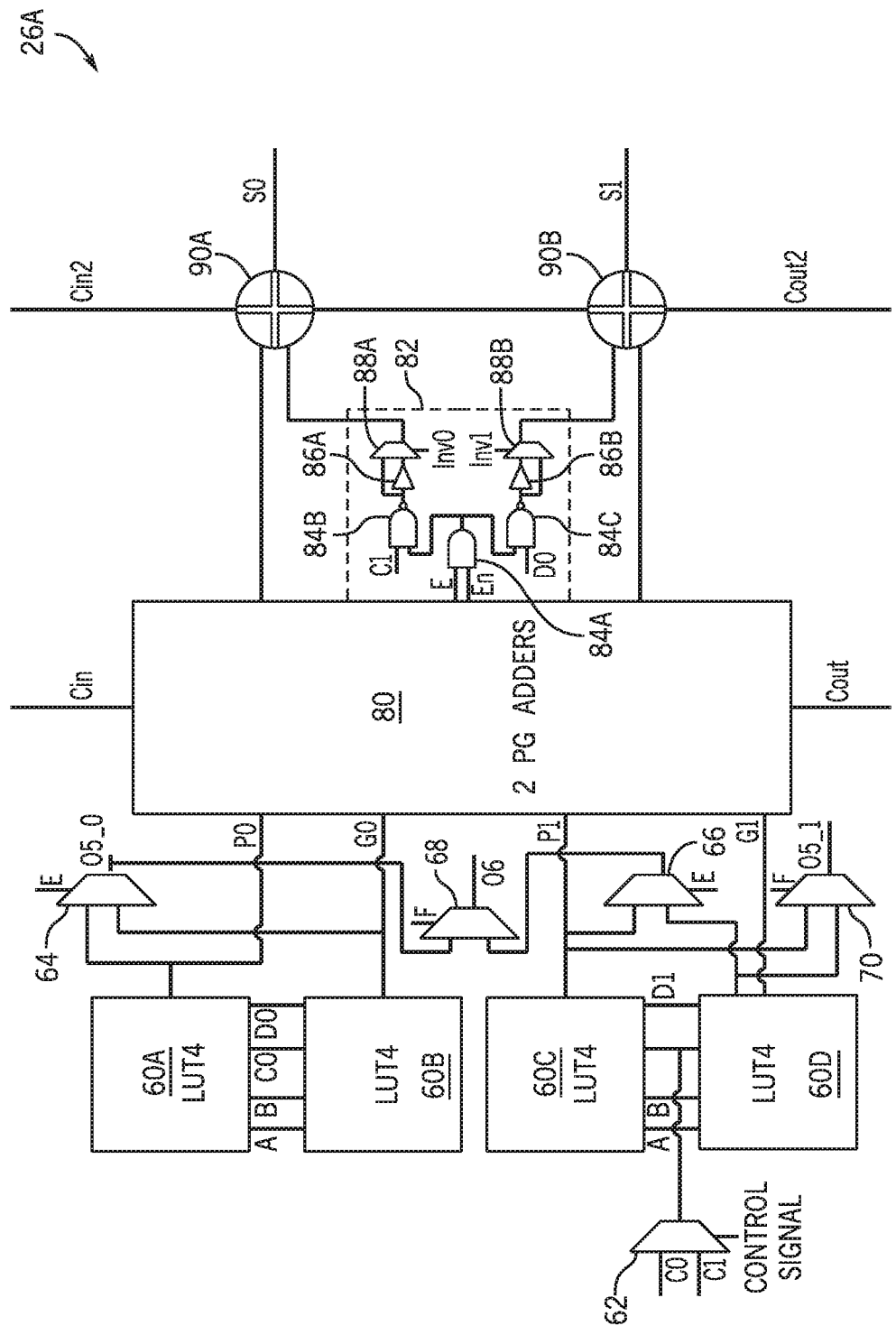
FIG. 3 is a schematic diagram of a logic block that may be implemented on the integrated circuit device of FIG. 1, in accordance with an embodiment.

Keeping the discussion of FIG. 1 and FIG. 2 in mind, a user (e.g., designer) may utilize the design software 14 to implement the logic block 26 on the programmable logic 48 of the integrated circuit device 12. In particular, the designer may specify in a high-level program that mathematical operations such as addition and multiplication be performed. The compiler 16 may convert the high-level program into a lower-level description that is used to program the programmable logic 48 to perform addition. With this in mind, FIG. 3 illustrates a logic block 26A that may be utilized to perform mathematical operations such as multiplication.

As illustrated, the logic block 26A includes four lookup tables (LUTs) 60 (e.g., LUTs 60A-60D) that may be four-input LUTs. In other words, each of the LUTs 60 may have four inputs (e.g., four single bit inputs), and the LUTs 60 may output one or more values (e.g., bit values) based on how each of the LUTs is programmed. For example, a first LUT 60A and second LUT 60B may each receive inputs A, B, C0, and D0 and output values based on the inputs A, B, C0, D0. For instance, the outputted value may be partial products determined while performing multiplication. Somewhat similarly, a third LUT 60C and fourth LUT 60D may each receive inputs A, B, D1 and either C0 or C1. The third LUT 60C and fourth LUT 60D may each output a bit value based on the input values received. Additionally, a multiplexer 62 that can receive inputs C0, C1, and a control signal. The integrated circuit device 12 may send control signals to cause the multiplexer 62 to output one value (e.g., C0 or C1) to be used as inputs for the LUTs 60C, 60D.

The LUTs 60 may be utilized to perform various mathematical operations and logic operations. For example, the LUTs 60 may perform logic operations on inputted values (e.g., A, B, C0, C1, D0, D1) while operating as carry-lookahead logic (e.g., performing addition). The outputs (e.g., at P0 and P1) may be utilized as propagating carries, and the outputs may be utilized as generating carries (e.g., at G0 and G1). The outputs may also be partial products of multiplication operations. The values generated by the LUTs 60 may be utilized as inputs into other circuitry included in the logic block 26A, such as a multiplexer 64, multiplexer 66, multiplexer 68, and multiplexer 70. The multiplexer 64 may receive the output values from LUTs 60A, 60B as well as an input E. The multiplexer 64 may output a value (e.g., O5_0). Similarly, the multiplexer 66 may receive the output values from the LUTs 60C, 60D as well as input E. The multiplexer 66 may output a value that may be used an input of the multiplexer 68, which may also receive the output of the multiplexer 64 and an input F. The multiplexer 68 may generate an output value O6. The multiplexer 70 may receive the outputs of the LUTs 60C, 60D as well as input F and generate an output O5_1 based on the values of these inputs.

Outputs of the LUTs 60 may also be used as inputs into adder circuitry 80, which may include two adders that are communicatively coupled to one another (e.g., two carry-lookahead adders in which one of the adders receives one or more outputs from the other adder). The adder circuitry 80 may also receive a carry-in value (e.g., Cin), for example, from other circuitry included in the integrated circuit device 12, such as another logic block 26. More specifically, inputs A, B, C0, D0, and D1 may be used in generating four partial products, propagating carries (e.g., P0 and P1), and generating carries (e.g., G0 and G1). As discussed below, the adder circuitry 80 may reduce the partial products. Furthermore, the adder circuitry 80 may generate a carry-out value (e.g., Cout) that may be provided to other circuitry included in the integrated circuit, such as another logic block 26.

The logic block 26A also includes circuitry 82 that, as illustrated, has gates 84 (e.g., logical AND gates, logical NAND gates) and programmable inverters. The circuitry 82 may use inputs E, D0, and C1 to generate two partial products in addition to the four partial products generated by the adding circuitry 80. The circuitry 82 may reduce these two partial products as well as the four partial products generated by the adder circuitry 80. As such, the logic block 26 may generate and reduce six partial products.

The gate 84A may receive input E and an input En. The input En may be an enable/disable signal provided by the integrated circuit device 12 to disable the circuitry 82 when the circuitry 82 is not used and enable the circuitry 82 when the circuitry 82 is to be used. For example, by disabling the circuitry 82, power usage that may otherwise be caused by toggling signals may be reduced or eliminated. The gate 84A may generate an output, which may be used as an input for both of the gates 84B, 84C. The gate 84B may receive input C1 and output a value (e.g., that is provided to a logical NOT gate 86A and a multiplexer 88A), and the gate 84C may receive input D0 and output a value (e.g., that is provided to a logical NOT gate 86B and a multiplexer 88B). The multiplexers 88 may receive inverter signals (e.g., Inv0 for multiplexer 88A and Inv1 for multiplexer 88B) from the integrated circuit device 12 and be utilized when performing signed multiplication (e.g., multiplication that may include positive and negative values). Furthermore, while the embodiment illustrated in FIG. 3 includes programmable inverters ((e.g., Inv0 and Inv1) of FIG. 3)) other types of inverters may be utilized in other embodiments.

Additionally, the logic block 26A includes two additional adders 90A, 90B. The adders 90 may each receive three inputs and output two values. For example, adder 90A may receive an output from the adding circuitry 80, an output from the multiplexer 88A, and a carry-in value Cin2 to produce a value S0 and a carry out value. The carry-in value Cin2 may be a carry-out value generated by another logic block 26. The adder 90B may receive the carry out value from the adder 90A, an output from the adding circuitry 80, and an output from the multiplexer 88B to determine a value S1 and a carry-out value Cout2.

As discussed below, the logic block 26A may be utilized to perform multiplication operations. However, before progressing to specific examples of multiplication operations carried out by the logic block 26A, a general discussion of multiplication and mapping is provided. As discussed below, mapping may be undertaken in order to determine how to program the programmable logic 48 of the integrated circuit device 12 to perform multiplication.

Figure 4:
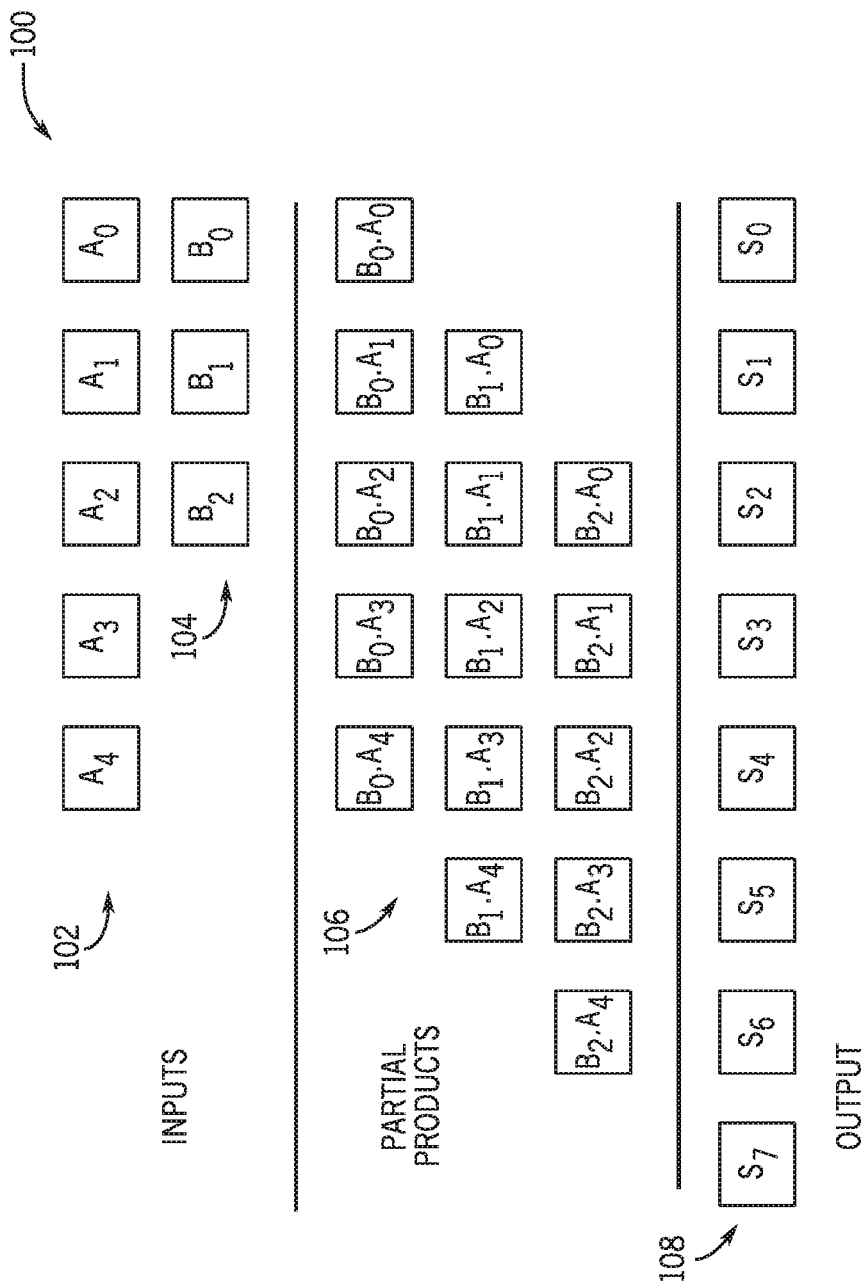
FIG. 4 illustrates an example of unsigned multiplication, in accordance with an embodiment.

Multiplication operations can generally be performed in two stages: partial product generation and partial product reduction. In partial product generation, each bit of one input is multiplied with each bit of another input. To help elaborate, FIG. 4 illustrates a diagram 100 showing an input 102 being multiplied by another input 104. In particular, the input 102 is a five bit input (e.g., input A having bits 0-4), and the input 104 is a three bit input (e.g., input B having bits 0-2). Multiplying each bit of the input 102 with each bit of the input 104 results in partial products 106. In the partial product reduction state, the partial products 106 can be summed (e.g., using adders) to determine an output 108 that is the sum of the partial products 106 and the product of the inputs 102, 104.

Figure 5:
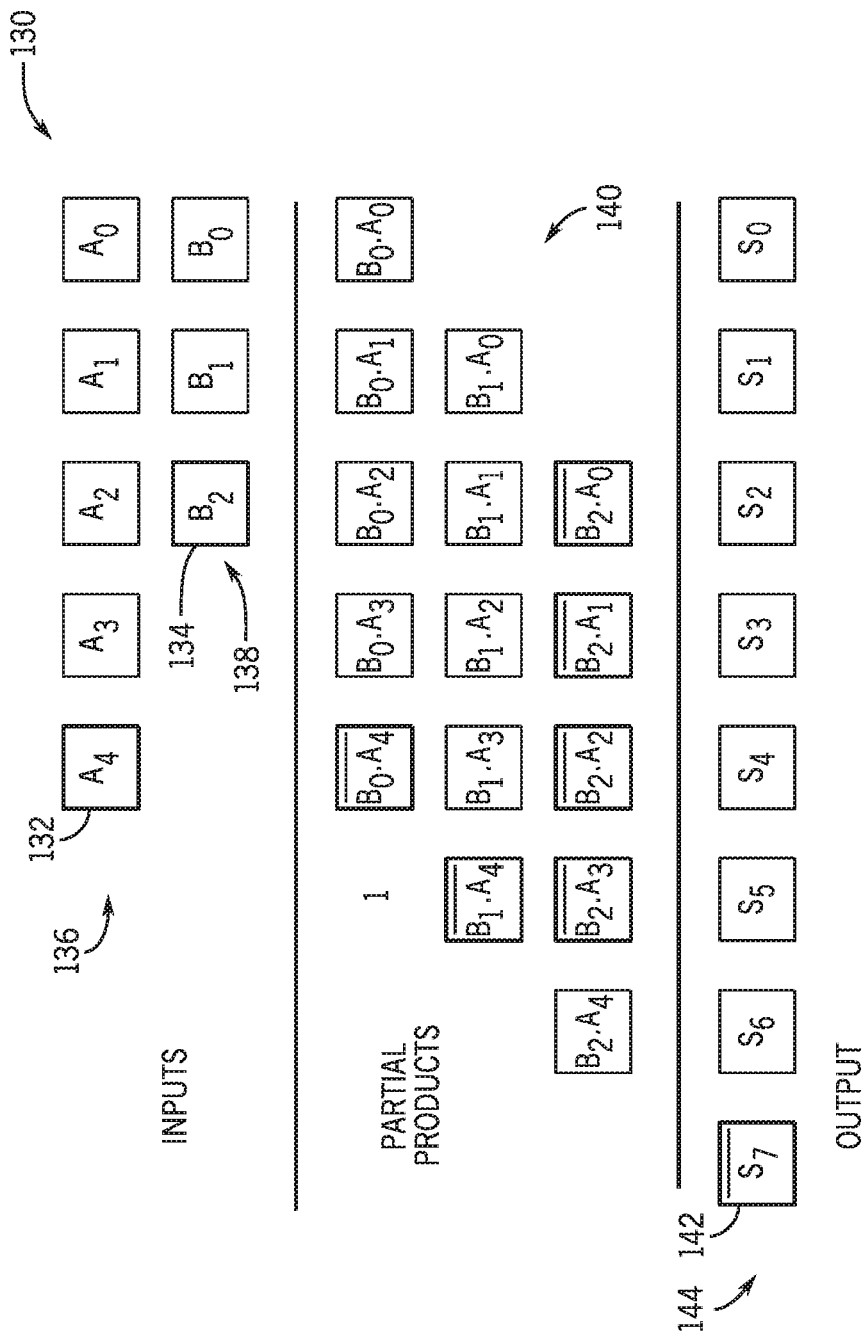
FIG. 5 illustrates an example of signed multiplication, in accordance with an embodiment.

The example provided in FIG. 4 can be referred to as an example of unsigned multiplication, meaning whether a value is positive or negative is not taken into account. Signed multiplication, on the other hand, does take into account whether values being multiplied are positive or negative. FIG. 5 is a diagram 130 illustrating an example of signed multiplication. Most significant bits 132, 134 may respectively indicate whether inputs 136, 138 are positive or negative. During partial product generation, partial products 140 are determined. Some of the partial products 140 may be inverted, as indicated by shading in FIG. 5. For instance, a partial product may be inverted when it is a partial product involving one of the most significant bits 132, 134. A constant "1" may also be added to a first row of the partial products 140. Additionally, as illustrated in FIG. 5, a most significant bit 142 of an output 144 (i.e., the sum of the partial products 140) may be inverted.

To perform multiplication using the logic blocks 26, the integrated circuit device 12 may perform a mapping process to determine how the bits of the values being multiplied are input into the inputs of the logic blocks 26. With this in mind, FIG. 6 illustrates a flow diagram of a process 160 that may be performed using the integrated circuit device 12 using one or more logic blocks 26, for instance, to carry out multiplication operations.

At process block 162, inputs may be received. For example, the inputs may include one or more bits that are to be multiplied.

At process block 164, the integrated circuit device 12 may determine a mapping for the inputs. In other words, the integrated circuit device 12 may determine how to carry out the multiplication operation involving the inputs. To determine a mapping, the integrated circuit device 12 may determine one or more patterns among the inputs as well as partial products that may be generated while determining a product of the two inputs. Examples of specific patterns are discussed below in more detail.

At process block 166, the integrated circuit device 12 may multiply the two inputs based on the mapping. For instance, circuitry in the integrated circuit device 12 (e.g., programmable logic 48, lookup tables 60) may be programmed based on the mapping, and, as discussed below, components of each pattern (e.g., bits of an input or partial products) may be input to specific inputs of the logic blocks 26 based on the mapping. Accordingly, the logic blocks 26 may determine a product of two values being multiplied.

Keeping the foregoing in mind, different patterns will be discussed. However, before proceeding to discuss the patterns, FIG. 7 is provided to show types of symbols that are used to discuss the patterns. In particular, FIG. 7 includes a partial product 180 (indicated by a circle), a non-carry bit 182 (indicated by a square), and a carry bit 184 (indicated by a pentagon). The illustrated partial product 180 is a partial product of $B_j$ and $A_i$, where i and j are bits of inputs A and B, respectively (e.g., the $i^{th}$ bit of input A and the $j^{th}$ bit of input B). Various types of patterns and how bits of inputs being multiplied may be inputted into the logic blocks 26 will now be discussed.

Figure 8:
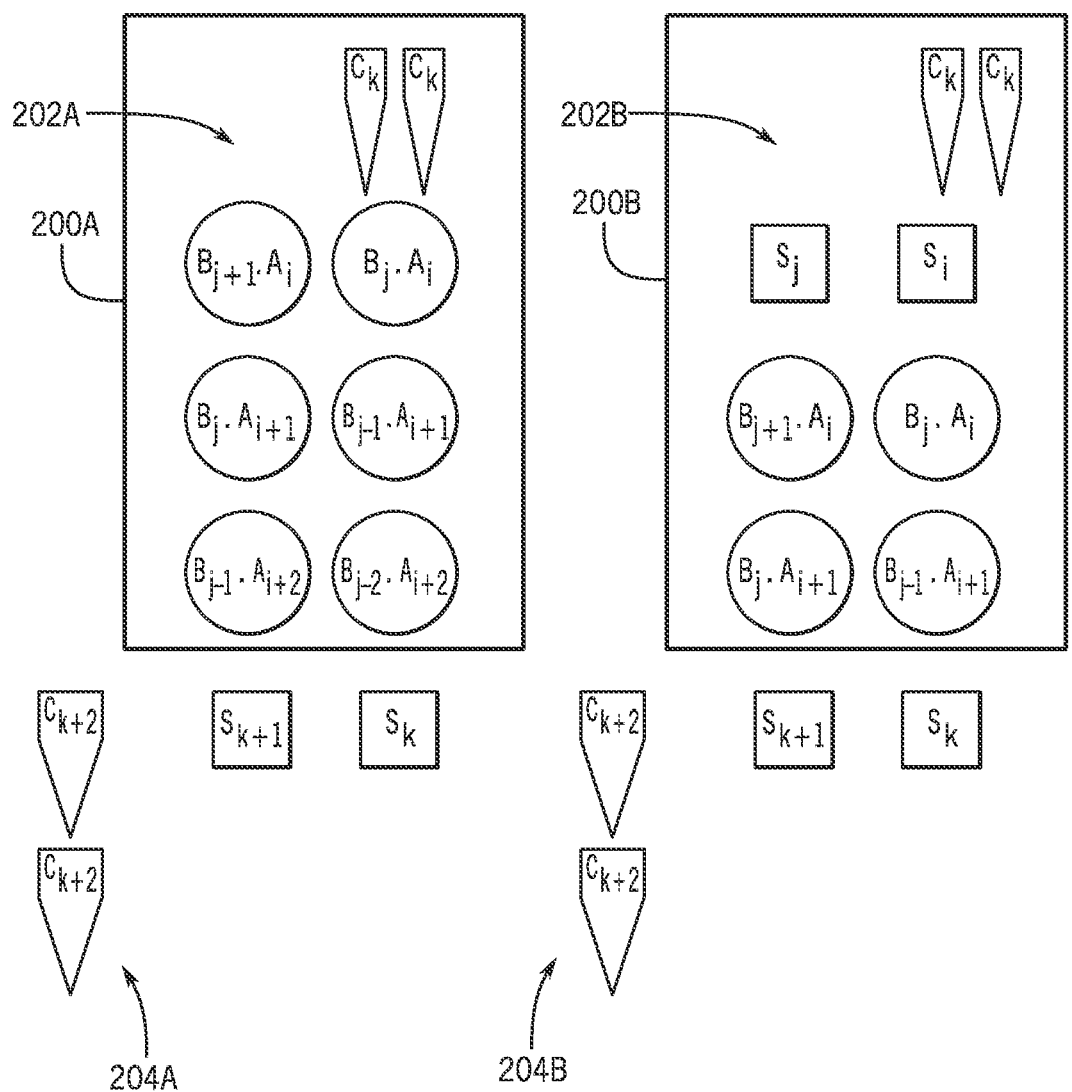
FIG. 8 illustrates two patterns associated with multiplication operations, in accordance with an embodiment.

FIG. 8 illustrates two patterns 200A, 200B. The patterns 200A, 200B respectively include symbols 202A, 202B that can be used and/or determined by a single logic block 26 (e.g., logic block 26A) to generate outputs 204A, 204B. For example, carry-in values may be utilized, while partial products may be generated. For instance, in pattern 200A, two carry-in values may be received, six partial products may be determined (based on values of bits of inputs A and B), and the output 204A that includes two non-carry bits and two carry bits may be the output from the logic block 26A. More specifically, when utilizing the patterns 200A, 200B, the logic block 26A may receive two carry-in values (e.g., from another logic block 26 communicatively coupled to the logic block 26A) and up to seven inputs, and the logic block 26A may generate up to two carry bits and two non-carry bits. Table 1 is provided below to indicate how inputs A and B may be routed using the logic block 26A.

TABLE 1

| Input on logic block 26 in FIG. 3 | Input Value |
|---|---|
| A | $A_i$ |
| B | $A_{i+1}$ |
| C0 | $B_j$ |
| D0 | $B_{j-1}$ |
| D1 | $B_{j+1}$ |
| C1 | $B_{j-2}$ |
| E | $A_{i+2}$ |

Additionally, referring briefly to FIG. 3, carry bits may be received (e.g., from another logic block 26) via carry lines Cin and Cin2. Furthermore the bits of the outputs 204A, 204B generated using the patterns 200A, 200B may be generated at S0, S1, and carry-outs (e.g., Cout and Cout2). Returning to FIG. 8, it should be noted that the pattern 200B may be utilized to perform multiply-accumulate operations.

Figure 9:
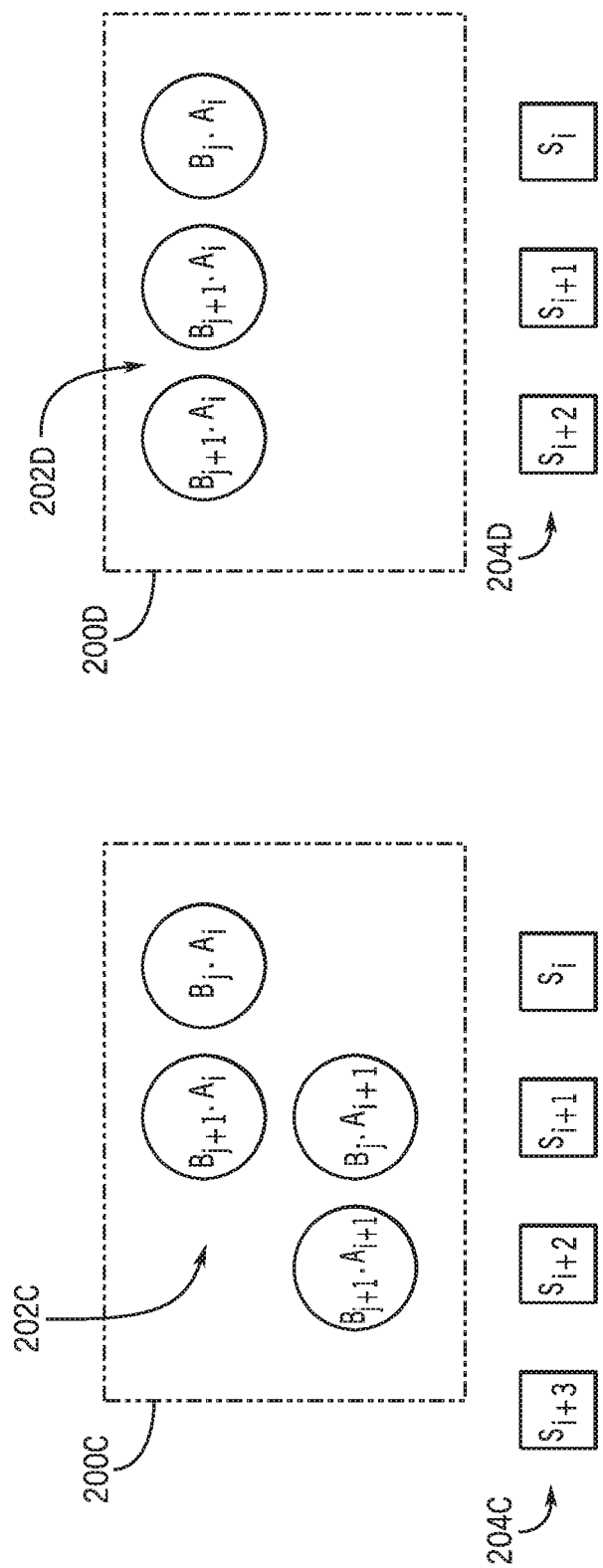
FIG. 9 illustrates two additional patterns associated with multiplication operations, in accordance with an embodiment.

Continuing with the discussion of patterns, FIG. 9 illustrates two patterns 200C, 200D. The patterns 200C, 200D respectively include symbols 202C, 202D that can be used and/or determined by a single logic block 26 (e.g., logic block 26A) to generate outputs 204C, 204D. In pattern 200C, four partial products may be determined (based on values of bits of inputs A and B), and the output 204C that includes up to four non-carry bits may be the output from the logic block 26A. In pattern 200D, three partial products (i.e., symbols 202D) may be determined, and the output 204D may include up to three non-carry bits. Table 2 is provided below to indicate how inputs A and B may be routed using the logic block 26A when utilizing pattern 200C, and Table 3 is provided to indicate how inputs A and B may be routed using the logic block 26A when utilizing pattern 200D.

TABLE 2

| Input on logic block 26 in FIG. 3 for Pattern 200C | Input Value |
|---|---|
| A | $A_i$ |
| B | $A_{i+1}$ |
| C0 | $B_j$ |
| D0 | $B_{j+1}$ |
| C1 | $B_j$ |
| D1 | $B_{j+1}$ |
| E | "2" |
| F | "2" |

TABLE 3

| Input on logic block 26 in FIG. 3 for Pattern 200D | Input Value |
|---|---|
| A | $A_i$ |
| C0 | $B_j$ |
| C1 | $B_{j+1}$ |
| D1 | $B_{j+2}$ |
| E | "1" |
| F | "1" |

Referring to FIG. 3, the output 204C generated using the pattern 200C, may be at S0, S1, O5_0 and O5_1. The output 204D generated using the pattern 200D, may be at S0, S1, and O5_1.

Figure 10:
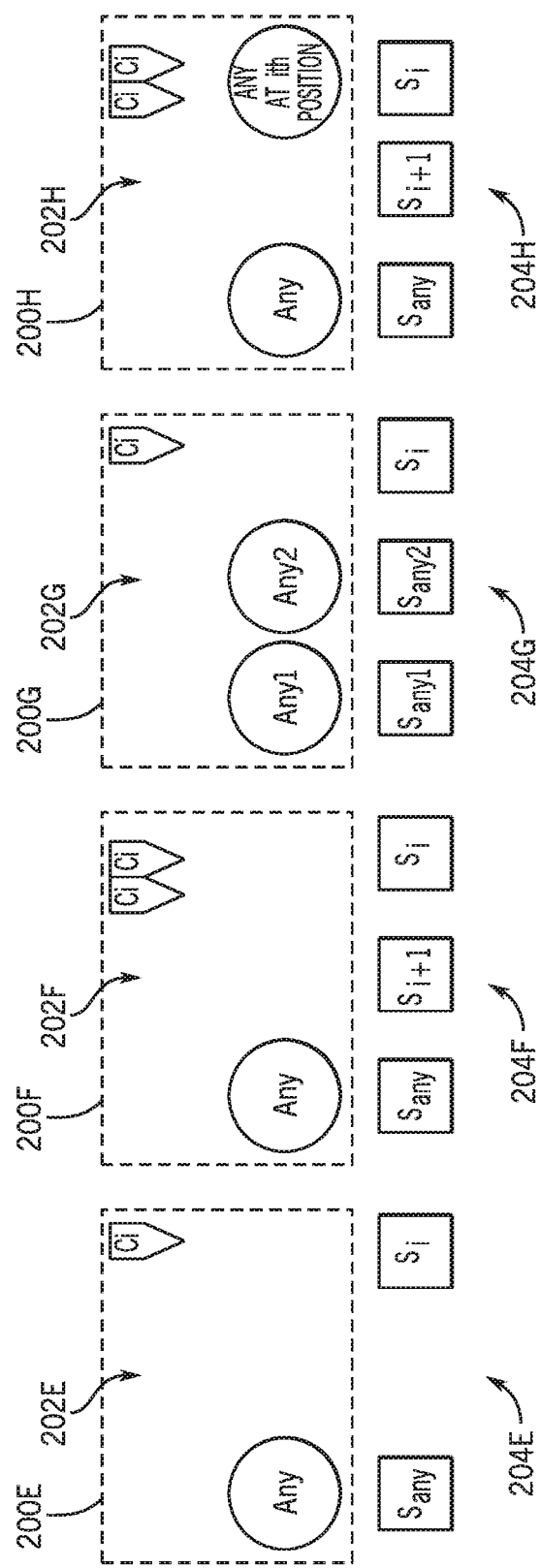
FIG. 10 illustrates four patterns associated with multiplication operations, in accordance with an embodiment.

FIG. 10 illustrates four patterns 200E, 200F, 200G, 200H that, in general, may be used to turn one or more carry-in signals into non-carry signals and generate a partial product. Additionally, partial products (e.g., produced by LUTs 60 or adder circuitry 80) may be inputs. The patterns 200E, 200F, 200G, 200H respectively include symbols 202E, 202F, 202G, 202H that can be used and/or determined by a single logic block 26 (e.g., logic block 26A) to generate outputs 204E, 204F, 204G, 204H. For example, in pattern 200E, one carry-in bit may be used as an input, and one partial product may be determined (based on values of bits of inputs A and B), and the output 204E includes up to two non-carry bits. In pattern 200F, two carry-in bits are received and one partial product is determined. The output 204F may include up to three non-carry bits. In pattern 200G, one carry bit may be received and two partial products may be determined; the output 204G may include up to three non-carry bits. In pattern 200H, two carry bits may be received and two partial products may be generated. The output 204H may include up to three non-carry bits.

Referring now to FIG. 3, when utilizing the pattern 200E, partial product inputs may be connected to inputs C0 and D0 and input E may be set to "1." The output will be generated at output O5_0. Additionally, the incoming carry bit (e.g., received from another logic block 26) may be received via carry line Cin, and a resulting output may be at S0. Additionally, it should be noted that utilizing the pattern 200E only uses a half logic block. In other words, when utilizing the pattern 200E, only two adjacent LUTs 60, one adder of the adder circuitry 80, and one of the adders 90A, 90B is utilized to determine the output 204E. Accordingly, the other half of the logic block 26A may be utilized for other determinations (e.g., using the pattern 200E on another set of inputs).

When utilizing the pattern 200F, partial product inputs may be connected to inputs C1 and D1, and input F is set to "1." The portion of the output 204F arising from a partial product input may be output via output O5_1. Carry bits may be received (e.g., from another logic block 26) via carry lines Cin and Cin2, and the corresponding portions of the output 204F are output via outputs S0 and S1.

When utilizing the pattern 200G, one of the partial product inputs is connected to inputs C0 and D0, and the other partial product input is connected to inputs C1 and D1. Inputs E and F are set to "1." The portions of the output 204G associated with the partial products will be generated at outputs O5_0 and O5_1. Similar to pattern 200E, the portion of the output 204G associated with a carry bit (e.g., received via carry line Cin from another logic block 26), may turn into a portion of the output 204 that is output at S0.

Pattern 200H may be used to generate a partial product at the same bit position as an incoming carry bits and reduce the partial product. When using the pattern 200H, one partial product input is connected to inputs C0 and D0. The outputs will be in S0 and S1. The second partial product is connected to inputs C1 and D1, and input F is set to "1" The corresponding portion of the output 204H will be at output O5_1. Carry bits may be received (e.g., from another logic block 26) via carry lines Cin and Cin2, and the corresponding portions of the output 204H are output via outputs S0 and S1.

Figure 11:
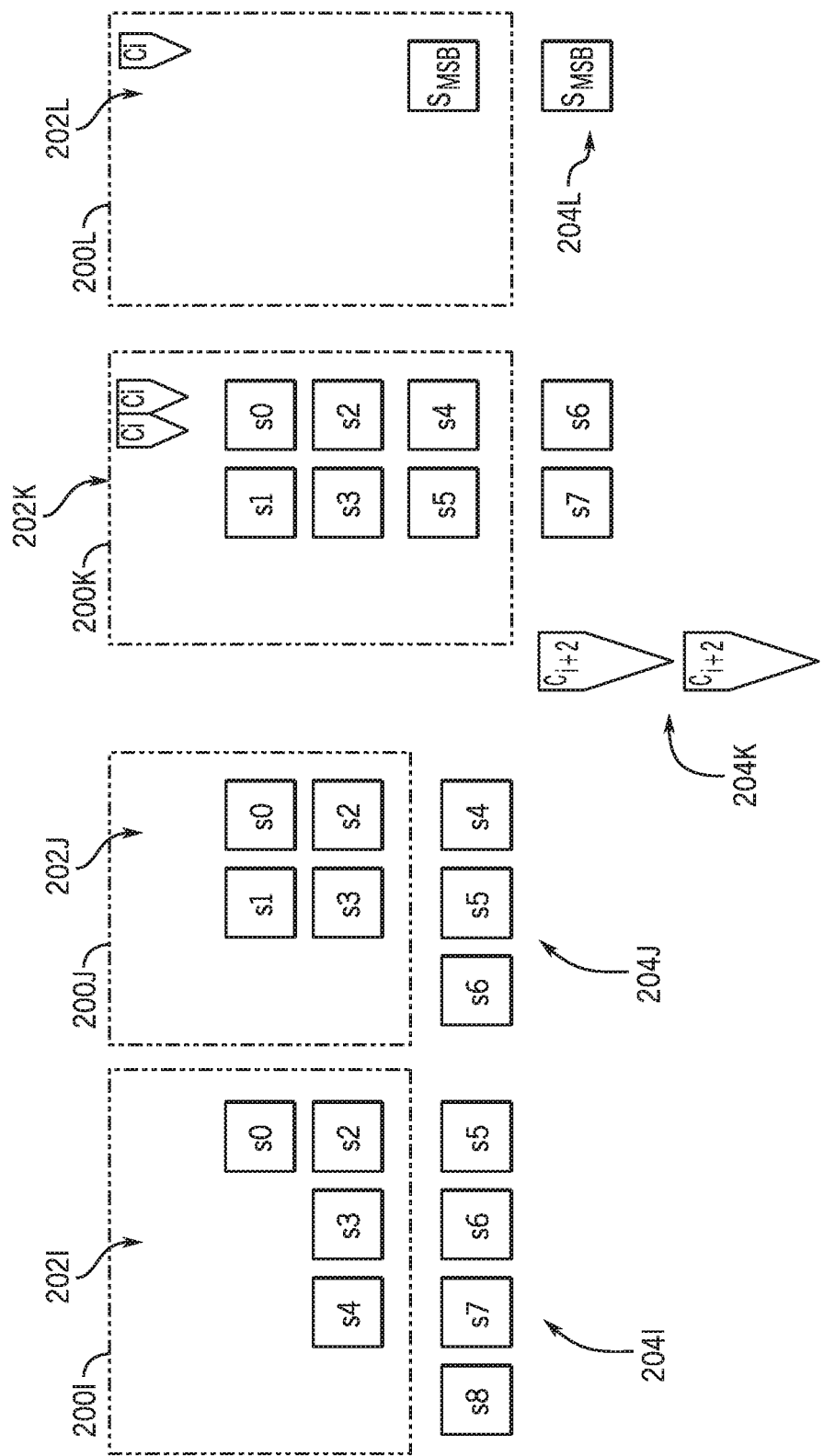
FIG. 11 illustrates four additional patterns associated with multiplication operations, in accordance with an embodiment.

Continuing with the discussion of patterns, FIG. 11 illustrates four patterns 200I, 200J, 200K, 200L that, in general, may be used to add single bits together. Additionally, partial products (e.g., produced by LUTs 60 or adder circuitry 80) may be inputs. The patterns 200I, 200J, 200K, 200L respectively include symbols 202I, 202J, 202K, 202L that can be used by a single logic block 26 (e.g., logic block 26A) to generate outputs 204I, 204J, 204K, 204L. For example, in pattern 200I, four non-carry bits may be used as inputs, and the output 204I may include up to four non-carry bits. In pattern 200J, four non-carry bits are received, and the output 204J may include up to three non-carry bits. In pattern 200K, two carry bits and six non-carry bits may be received. The output 204K may include up to two non-carry bits and two carry bits. In pattern 200L, one carry bit and one non-carry bit may be received, and the output 204L may include one non-carry bit.

Referring now to FIG. 3, when utilizing the pattern 200I, two inputs (i.e., two of the non-carry bits included in the symbols 202J) are connected to inputs A and B, and the other two inputs are connected to inputs C0, C1, D0, and D. The outputs will be at outputs S0, S1, O5_0, and O5_1. When utilizing the pattern 200I, the inputs will be connected in the same manner as the inputs when using the pattern 200I. However, the bits of the output 2004J will be at outputs S0, S1, and O5_1.

When utilizing the pattern 200K, inputs may be connected to according to Table 4 below:

TABLE 4

| Input on logic block 26 in FIG. 3 for Pattern 200K | Input Value |
|---|---|
| A | S0 |
| B | S1 |
| C0 | S2 |
| C1 | S4 |
| D0 | S5 |
| D1 | S3 |
| E | "1" |

The received carry bits may be received via carry lines Cin and Cin2 from another logic block 26 that is communicatively coupled to the logic block 26A inputs C1 and D1, and input F is set to "1." The non-carry bits of the output 204K may be generated at outputs S0 and S1, and the carry bits may be output via Cout and Cout2.

Pattern 200L may be used to generate when a carry bit and a non-carry bit are in the most significant bit of an output. In this situation, because both the carry bit and non-carry bit will not be equal to one, meaning an output generating by summing the carry bit and non-carry bit will generate a non-carry bit and no carry bits. When utilizing the pattern 200L, the carry bit may be received via carry line Cin, and the non-carry bit may be connected to input C0. The outputs may be generated at S0. Additionally, it should be noted that the pattern 200L only uses half of a logic block 26, meaning the other half of the logic block may be utilized to perform other determinations.

Bearing the discussion of the patterns 200 in mind, FIGS. 9 and 12-22C will be discussed to show mappings of various examples of N×N multiplication operations. The mappings may include one or more of the patterns 200 discussed above. In these examples, N is an integer ranging in value from two to nine indicative of the number of bits included in an input. For example, a 2×2 multiplication operation involves multiplying two inputs that each include two bits. Returning briefly to FIG. 9, to perform 2×2 multiplication operations, the integrated circuit device 12 may utilize pattern 200C to generate the output 204C as discussed above. Accordingly, 2×2 multiplication operations may be carried out using a single logic block 26.

Figure 12:
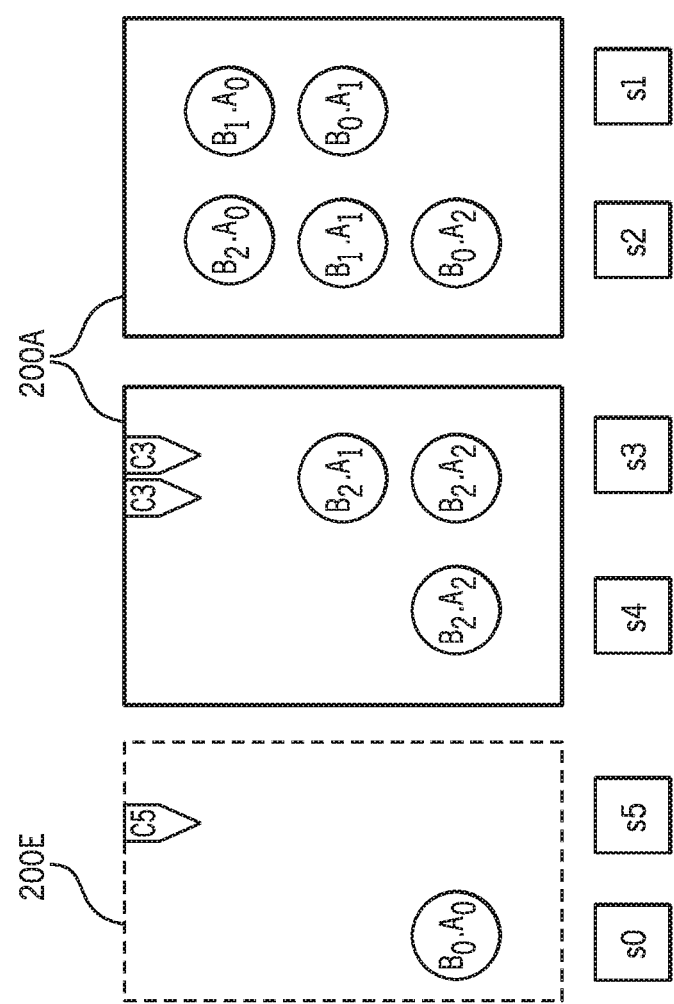
FIG. 12 illustrates a mapping of a 3×3 multiplication operation, in accordance with an embodiment.

FIG. 12 illustrates a 3×3 multiplication operation. As illustrated, the 3×3 multiplication operation may be carried out using the pattern 200A twice and the pattern 200E once. In this example, partial product A0B0 has been moved from the top right position to the left. The output bits may be moved around to create the correct output. As such, 3×3 multiplication operations may be performed using two and one-half logic blocks 26.

N×N multiplication operations in which N is greater than 3 may be performed using more than one stage. A "stage" generally refers to the number rows (or column, depending on orientation) of logic blocks 26 used to perform a multiplication operation. For example, the 2×2 and 3×3 multiplication operations discussed above can be done with a single stage. As discussed below, N×N multiplication operations in which N ranges from 4 to 9 may be performed in two stages. In these examples, bits may be determined using a first stage of logic blocks, and the bits may be provided as inputs to logic blocks 26 included in a second stage of logic blocks 26 (e.g., one or more logic blocks communicatively coupled to the logic blocks 26 of the first stage of logic blocks).

Figure 13A:
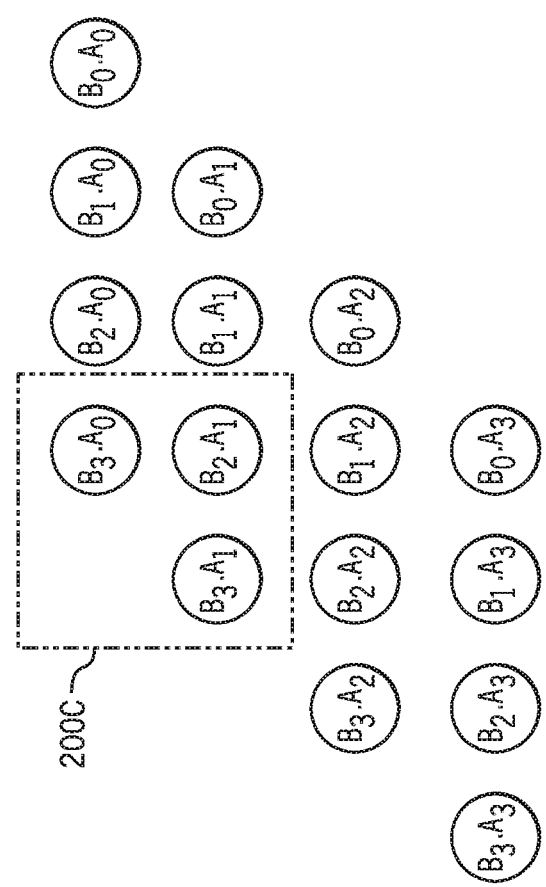
FIG. 13A illustrates a first stage of mapping of a 4×4 multiplication operation, in accordance with an embodiment.
Figure 13B:
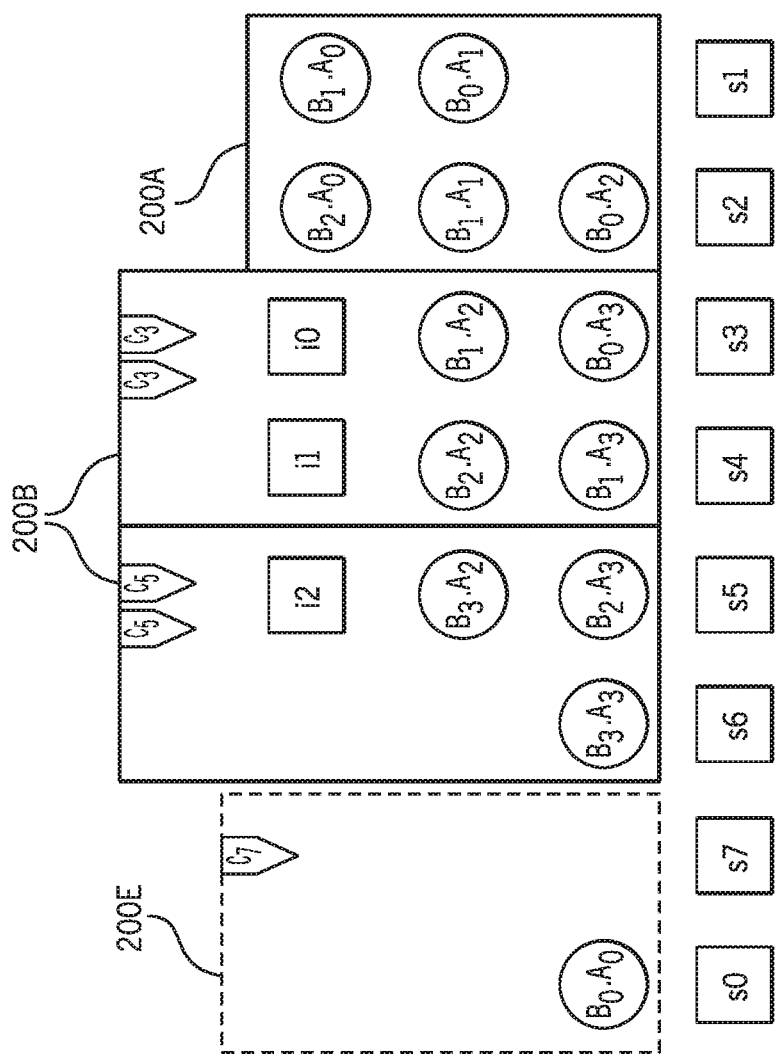
FIG. 13B illustrates a second stage of mapping of a 4×4 multiplication operation, in accordance with an embodiment.

FIG. 13A illustrates a first stage of a 4×4 multiplication operation. As illustrated, pattern 200C is used (which will generate non-carry bits of i0, i1, and i2). During a second stage illustrated in FIG. 13B, the pattern 200A may be used once, pattern 200B may be used twice, and pattern 200E may be used once. Accordingly, a total of four and one-half logic blocks 26 across two stages may be utilized to carry out 4×4 multiplication operations.

Figure 14A:
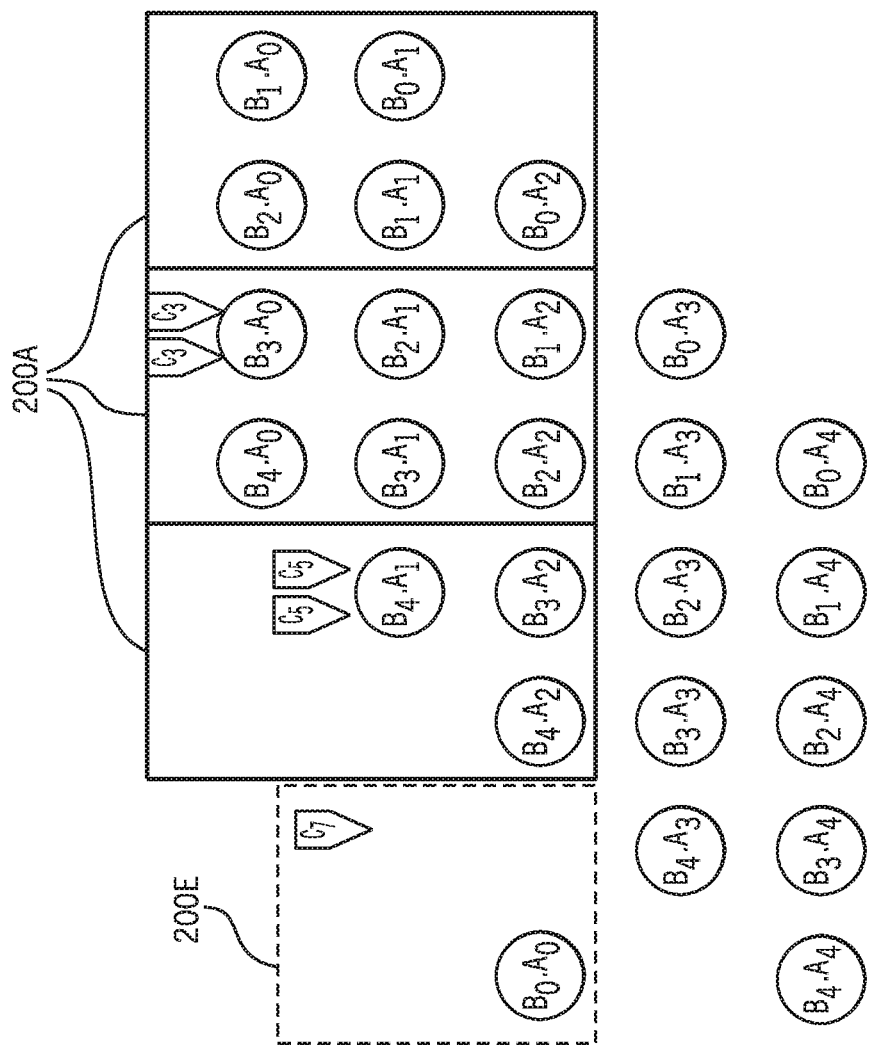
FIG. 14A is a illustrates a first stage of mapping of a 5×5 multiplication operation, in accordance with an embodiment.
Figure 14B:
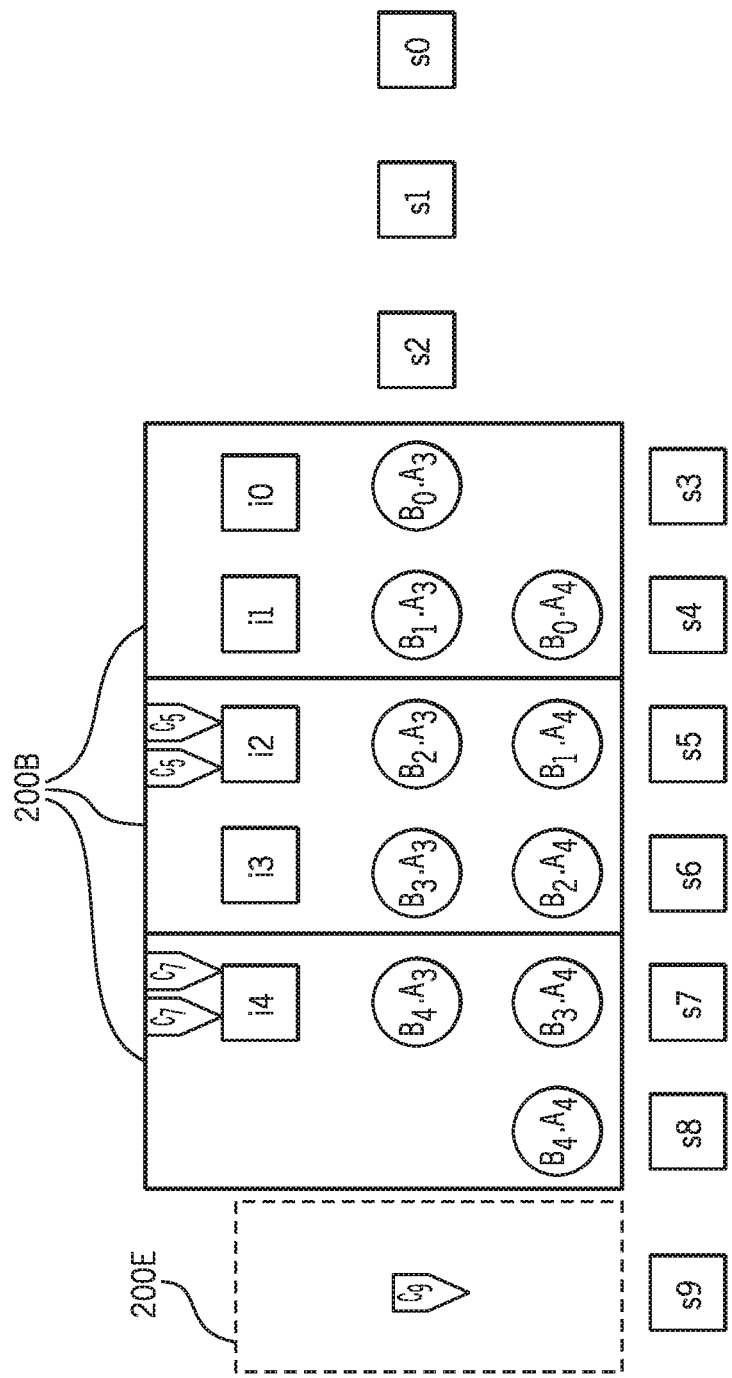
FIG. 14B is a illustrates a second stage of mapping of a 5×5 multiplication operation, in accordance with an embodiment.

FIG. 14A illustrates a first stage of a 5×5 multiplication operation in which the pattern 200A is used three times and pattern 200E is used once. As shown in FIG. 14B, partial products not generated during the first stage can be determined and summed with the bits generated during a second stage using the pattern 200B three times and the pattern 200E once. Accordingly, 5×5 multiplication operations can be performed using seven logic blocks 26 across two stages.

For cases in which N is two, three, four, or five, the examples provided above include both the fewest number of stages and logic blocks 26 that can be used to complete multiplication operations. However, for N×N multiplication operations discussed herein in which N is six, seven, eight, or nine, the mapping for a particular multiplication operation may be utilized to use the fewest number of stages or the fewest number of logic blocks 26. FIGS. 15A-18B relate to N×N multiplication operations in which the fewest number of stages is used, and FIGS. 19A-22C relate to N×N multiplication operation in which the fewest number of logic blocks 26 is utilized.

Figure 15A:
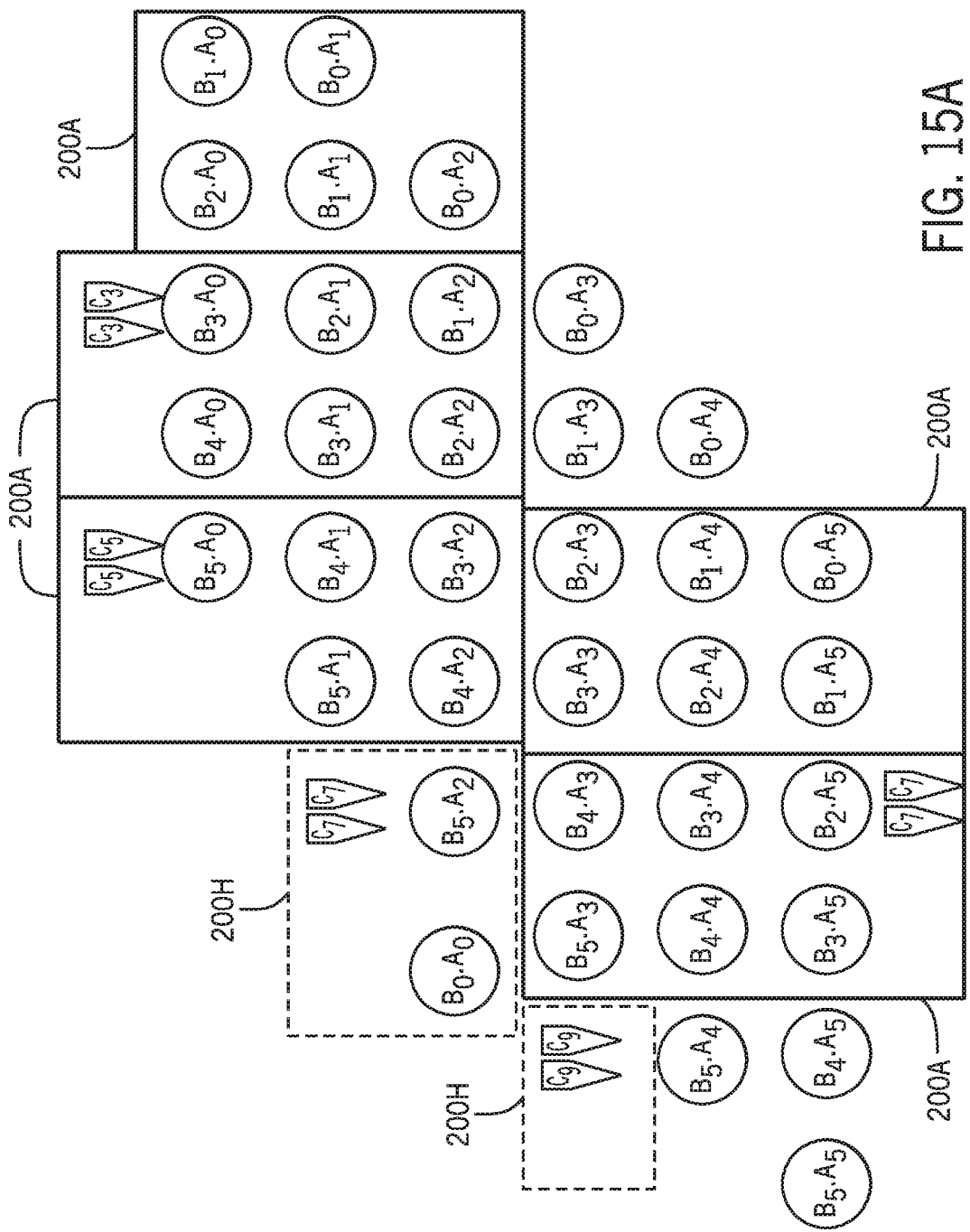
FIG. 15A is a illustrates a first stage of mapping of a 6×6 multiplication operation, in accordance with an embodiment.
Figure 15B:
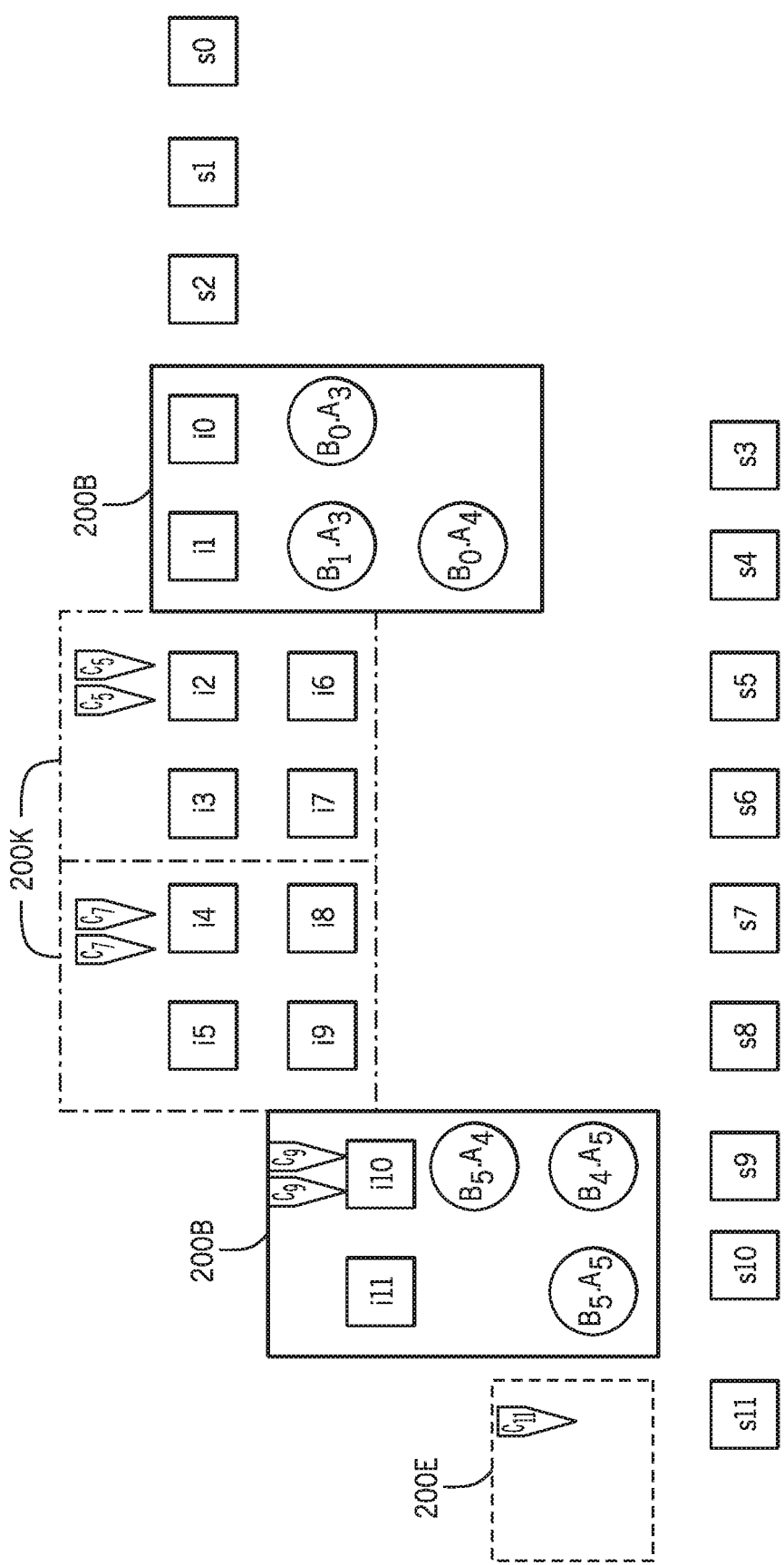
FIG. 15B is a illustrates a second stage of mapping of a 6×6 multiplication operation, in accordance with an embodiment.

FIG. 15A shows a first stage of a 6×6 multiplication operation in which the pattern 200A is used five times and the pattern 200H is used twice. In a second stage, as illustrated in FIG. 15B, patterns 200B, 200K may each be used twice, and pattern 200E may be used once. As such, 6×6 multiplication operations can be performed using eleven and one-half logic blocks 26 across two stages.

Figure 16A:
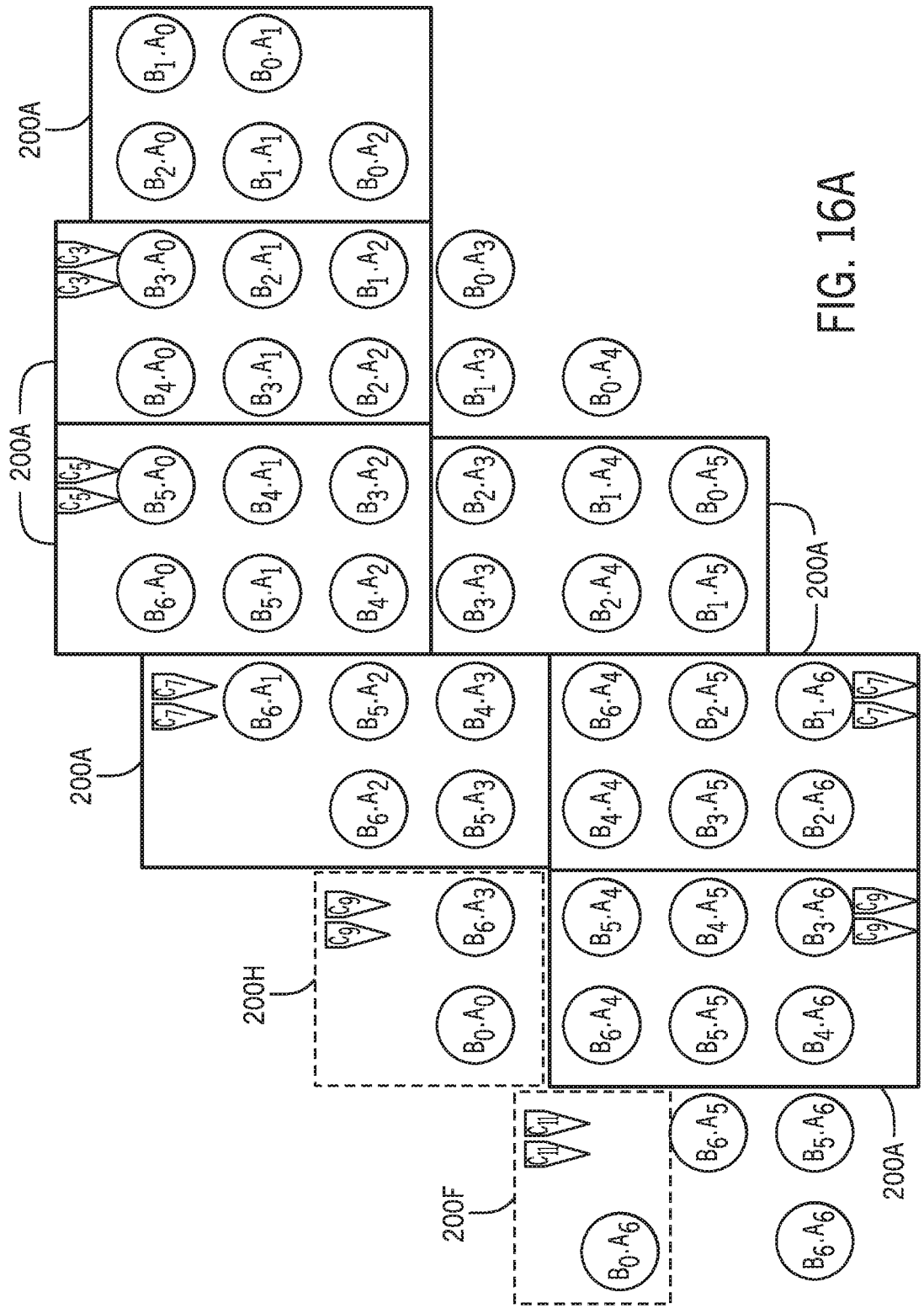
FIG. 16A is a illustrates a first stage of mapping of a 7×7 multiplication operation, in accordance with an embodiment.
Figure 16B:
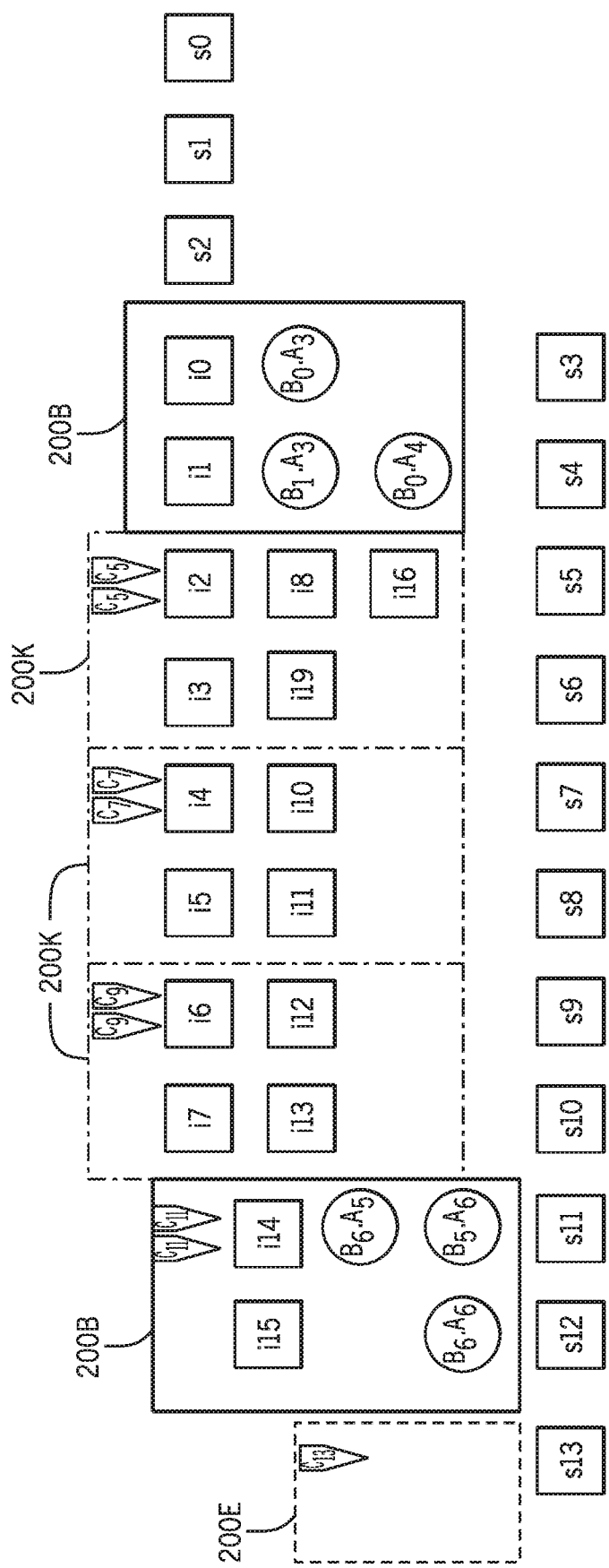
FIG. 16B is a illustrates a second stage of mapping of a 7×7 multiplication operation, in accordance with an embodiment.

FIG. 16A shows a first stage of a 7×7 multiplication operation in which the pattern 200A is used seven times, and patterns 200F, 200H are each used once. In a second stage, as illustrated in FIG. 16B, pattern 200B is used twice, pattern 200K is used three times, and pattern 200E is used once. As such, 7×7 multiplication operations can be performed using fourteen and one-half logic blocks 26 across two stages.

Figure 17A:
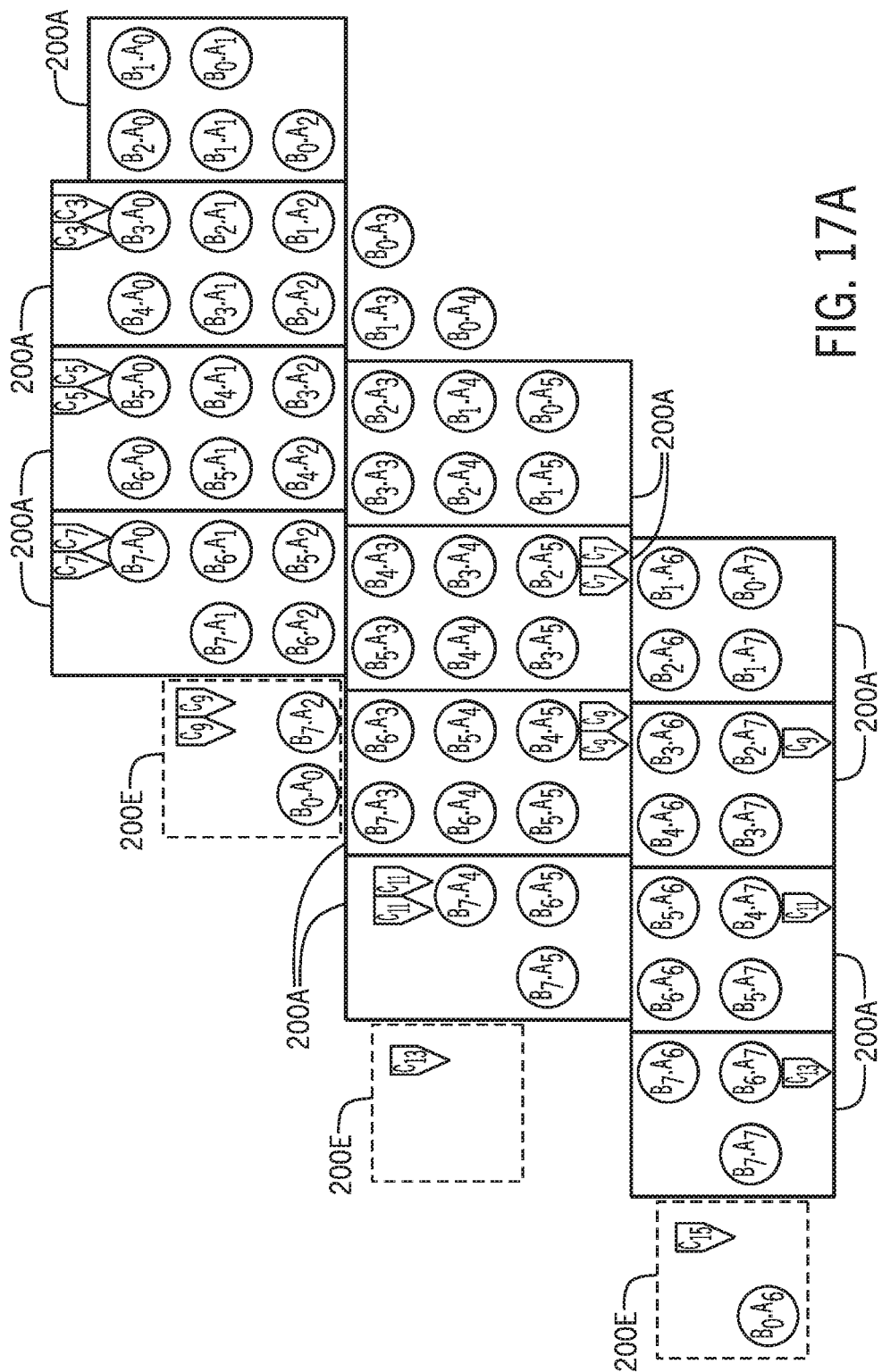
FIG. 17A is a illustrates a first stage of mapping of a 8×8 multiplication operation, in accordance with an embodiment.
Figure 17B:
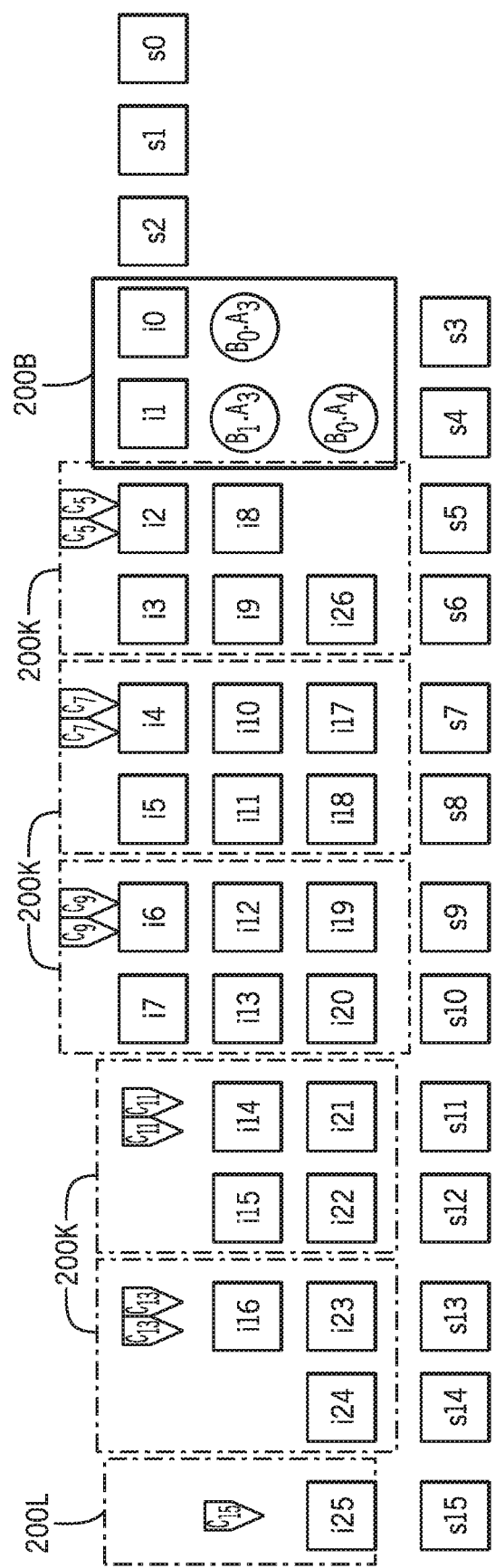
FIG. 17B is a illustrates a second stage of mapping of a 8×8 multiplication operation, in accordance with an embodiment.

FIG. 17A shows a first stage of an 8×8 multiplication operation in which the pattern 200A is used twelve times, pattern 200E is used twice, and pattern 200H is used twice. In a second stage, as illustrated in FIG. 17B, pattern 200B is used once, pattern 200K is used five times, and pattern 200I is used once. As such, 8×8 multiplication operations can be performed using twenty and one-half logic blocks 26 across two stages.

Figure 18A:
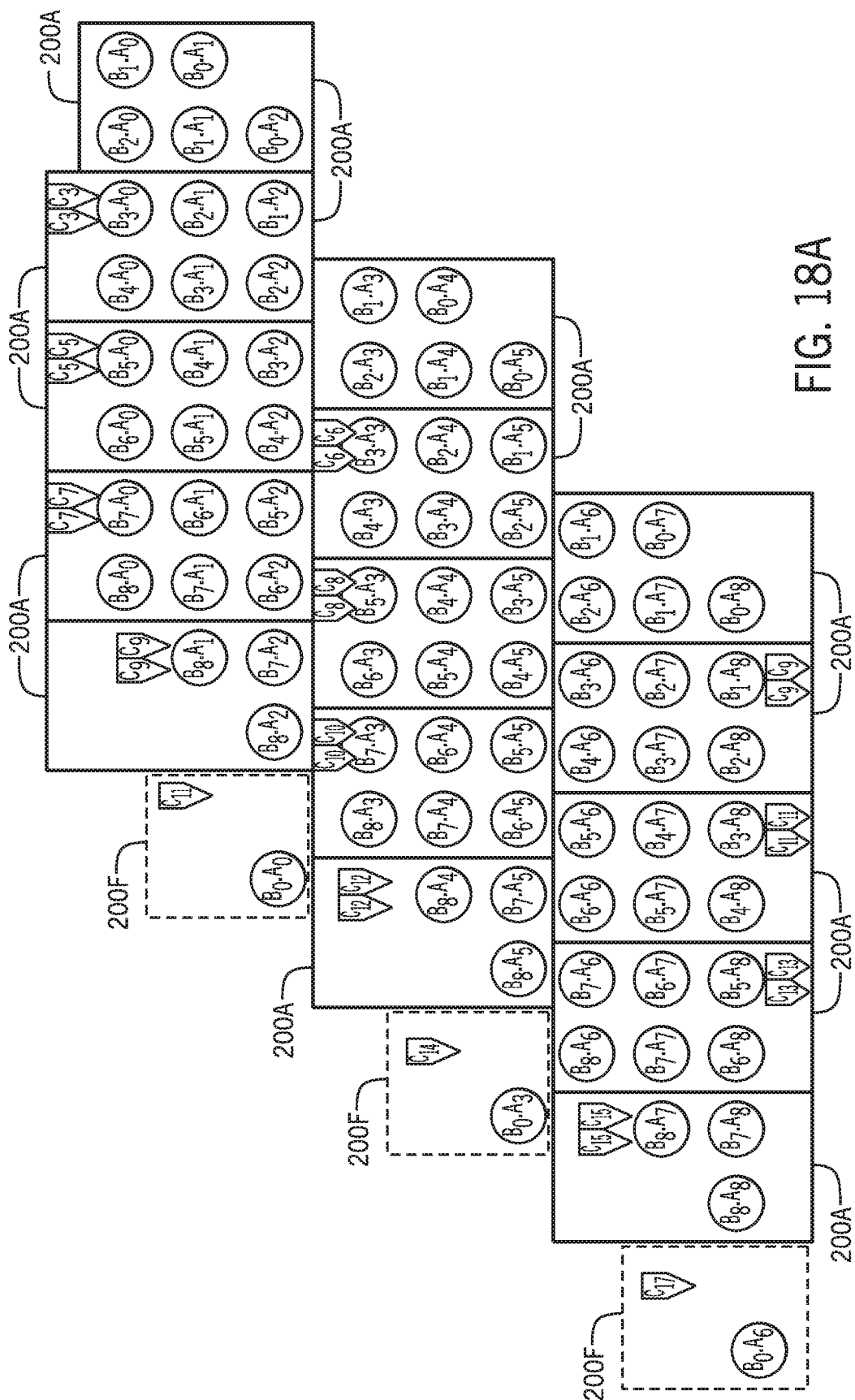
FIG. 18A is a illustrates a first stage of mapping of a 9×9 multiplication operation, in accordance with an embodiment.
Figure 18B:
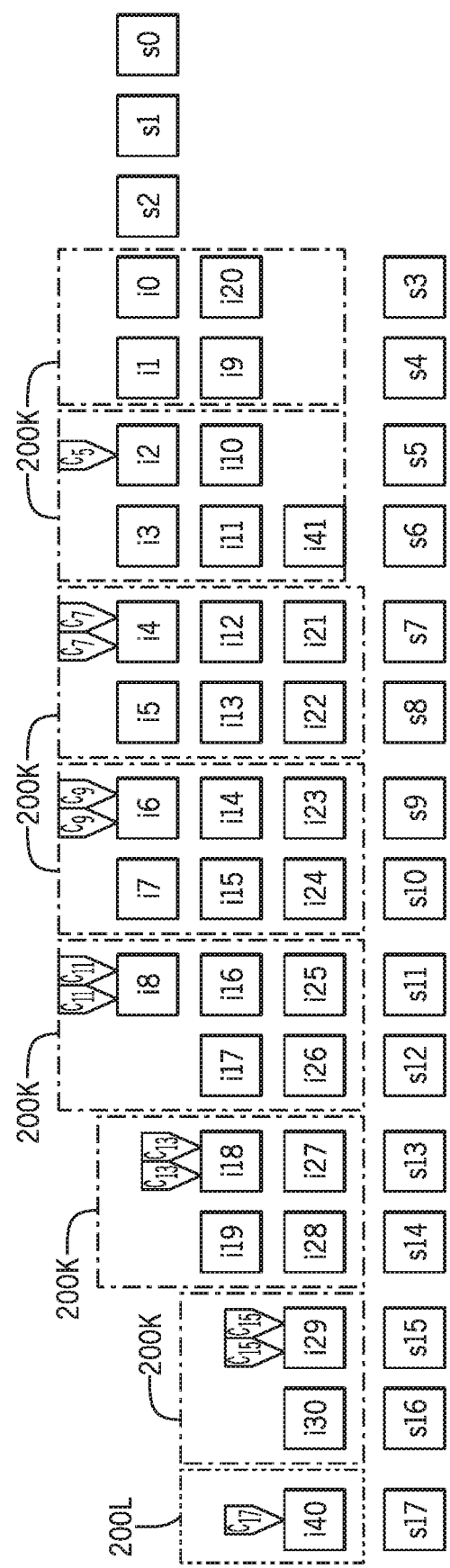
FIG. 18B is a illustrates a second stage of mapping of a 9×9 multiplication operation, in accordance with an embodiment.

FIG. 18A shows a first stage of a 9×9 multiplication operation in which the pattern 200A is used fifteen times and the pattern 200F is used three times. In a second stage, as illustrated in FIG. 18B, pattern 200K is used six times, and pattern 200L is used once. As such, 9×9 multiplication operations can be performed using twenty-five and one-half logic blocks 26 across two stages.

Figure 19B:
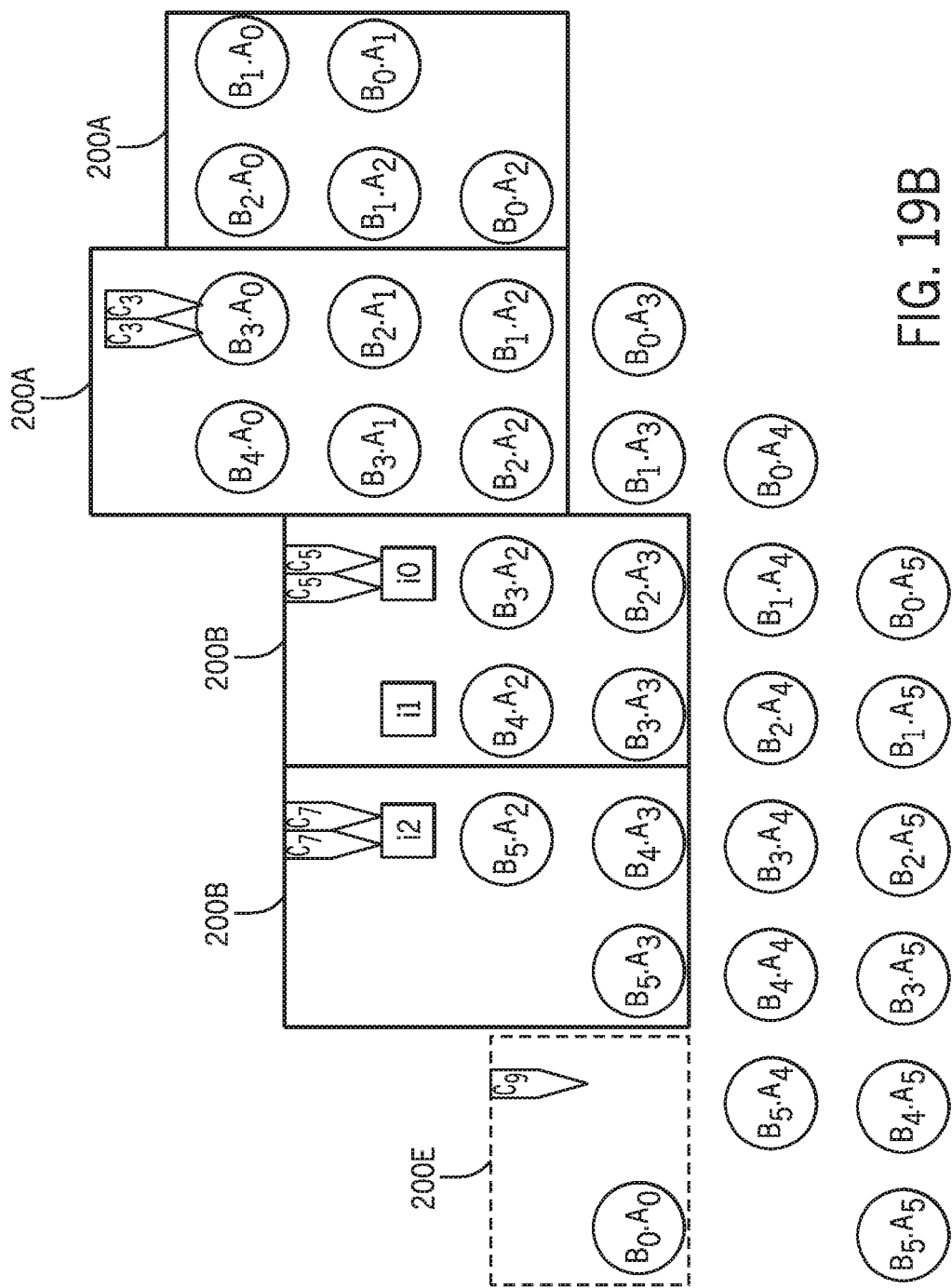
FIG. 19B is a illustrates a second stage of mapping of a 6×6 multiplication operation, in accordance with an embodiment.
Figure 19C:
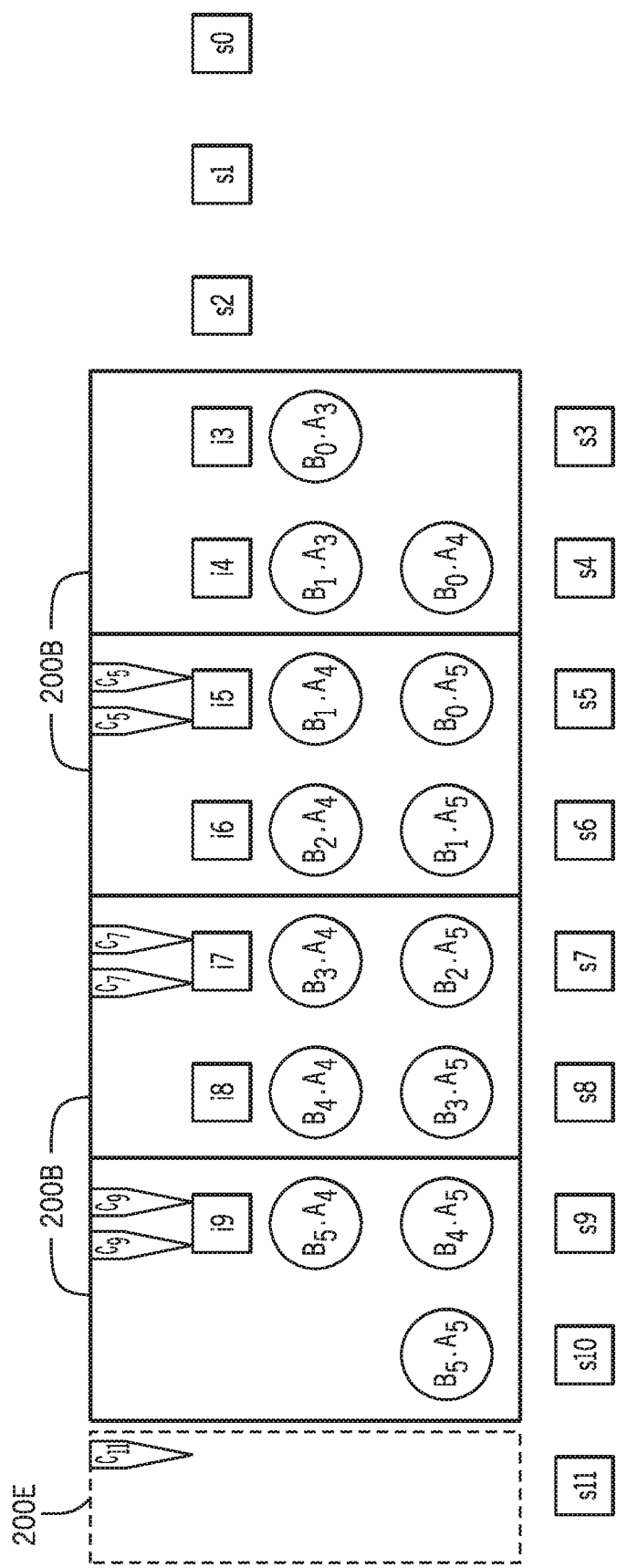
FIG. 19C is a illustrates a third stage of mapping of a 6×6 multiplication operation, in accordance with an embodiment.

As noted above, FIGS. 19A-22C provide examples of mappings for performing N×N multiplication operations in which the fewest number of logic blocks 26 is used. FIG. 19A shows a first stage of a 6×6 multiplication operation in which the pattern 200C is used once. In a second stage, as illustrated in FIG. 19B, pattern 200A and pattern 200B are each used twice, and pattern 200E is used once. FIG. 19C illustrates a third stage of a 6×6 multiplication operation in which the pattern 200B is used four times and the pattern 200E is used once. As such, 6×6 multiplication operations can be performed using ten logic blocks 26 across three stages.

Figure 20B:
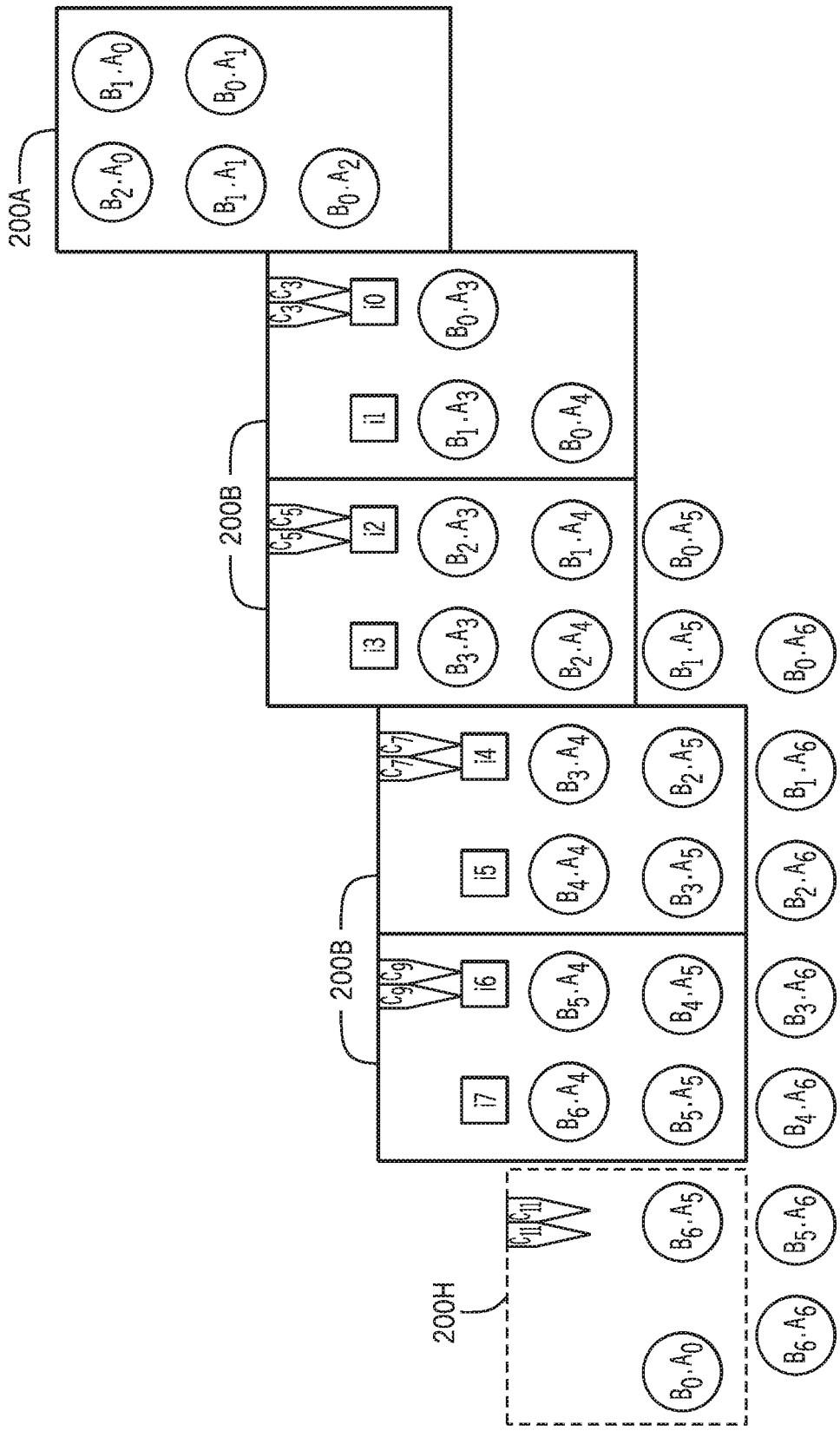
FIG. 20B is a illustrates a second stage of mapping of a 7×7 multiplication operation, in accordance with an embodiment.
Figure 20C:
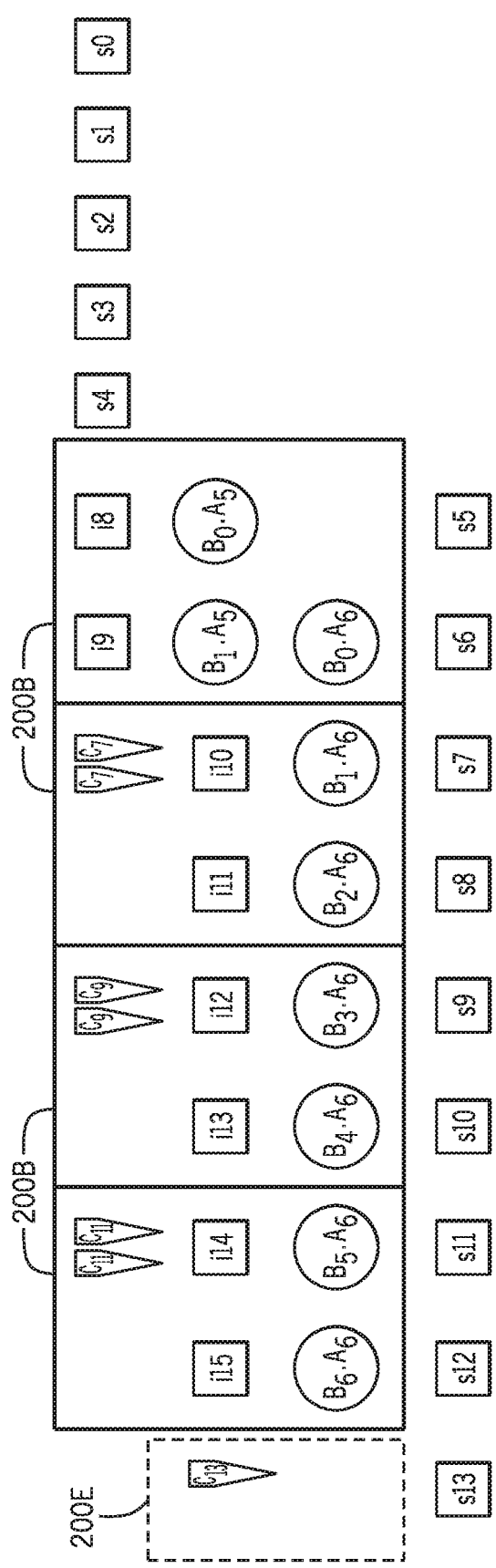
FIG. 20C is a illustrates a third stage of mapping of a 7×7 multiplication operation, in accordance with an embodiment.

FIG. 20A shows a first stage of a 7×7 multiplication operation in which the pattern 200A is used three times and the pattern 200H is used once. In a second stage, as illustrated in FIG. 20B, pattern 200A and pattern 200H are each used once, and pattern 200B is used four times. FIG. 20C illustrates a third stage of a 7×7 multiplication operation in which the pattern 200B is used four times and the pattern 200E is used once. As such, 7×7 multiplication operations can be performed using thirteen and one-half logic blocks 26 across three stages.

Figure 21A:
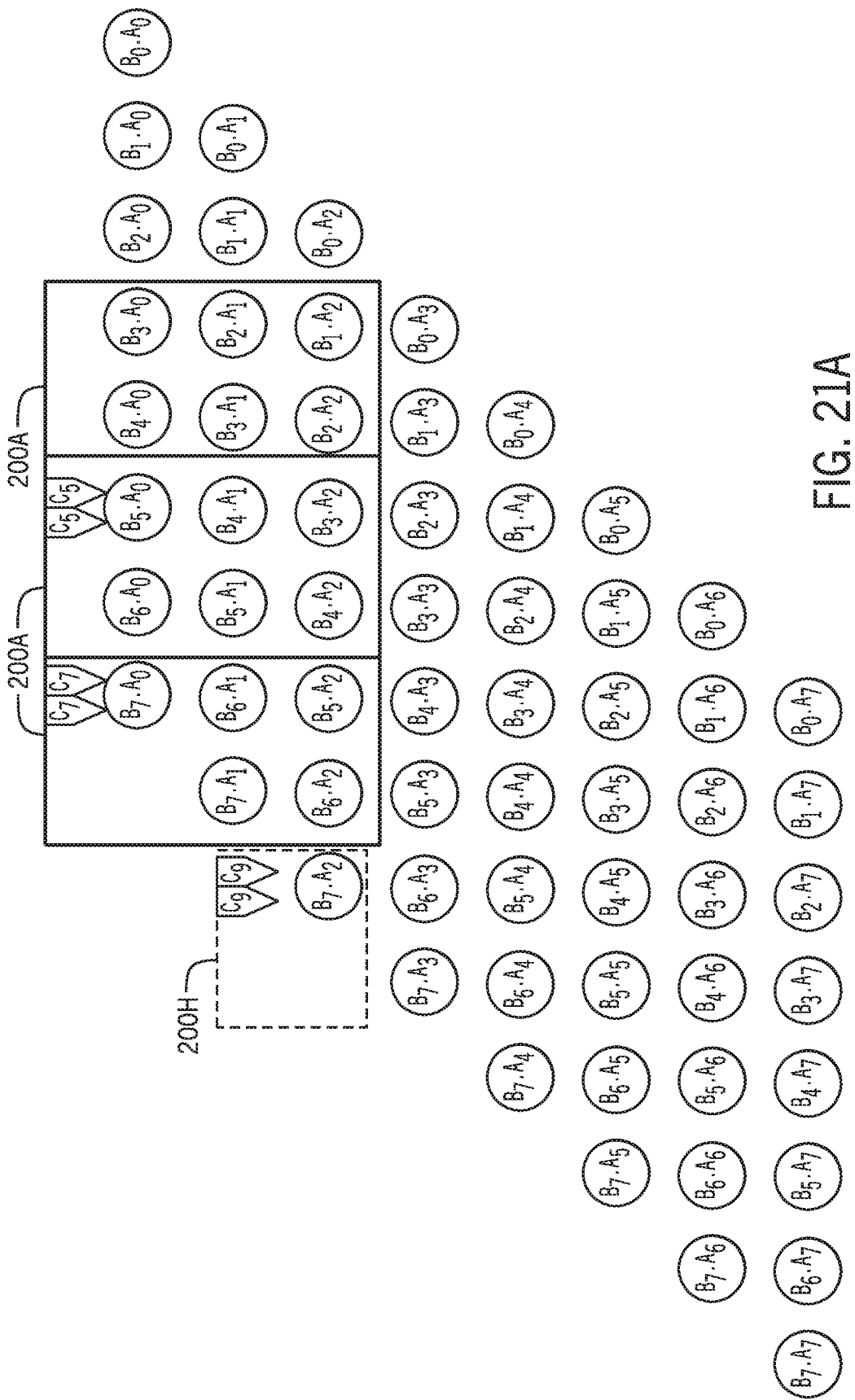
FIG. 21A is a illustrates a first stage of mapping of a 8×8 multiplication operation, in accordance with an embodiment.
Figure 21B:
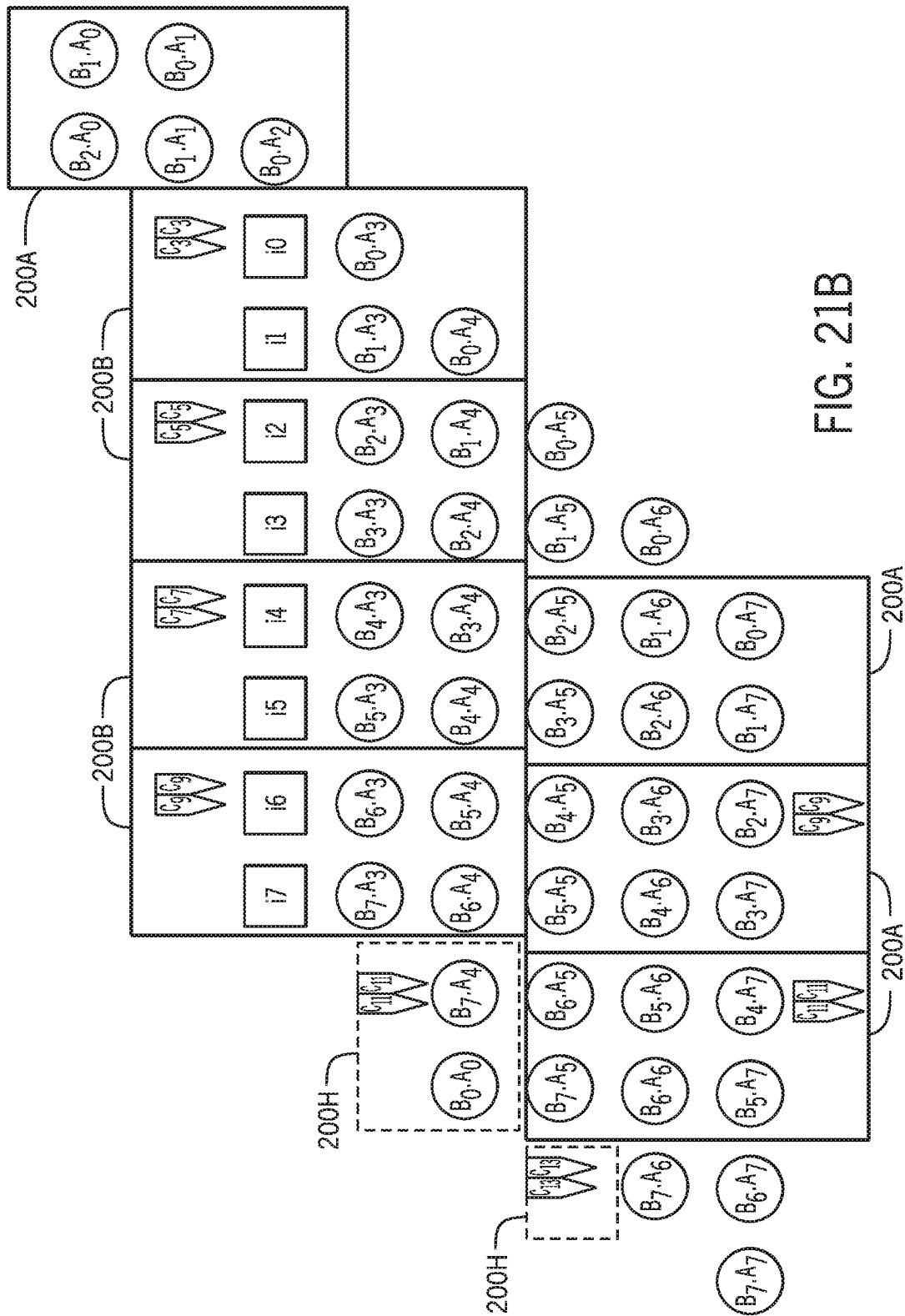
FIG. 21B is a illustrates a second stage of mapping of a 8×8 multiplication operation, in accordance with an embodiment.
Figure 21C:
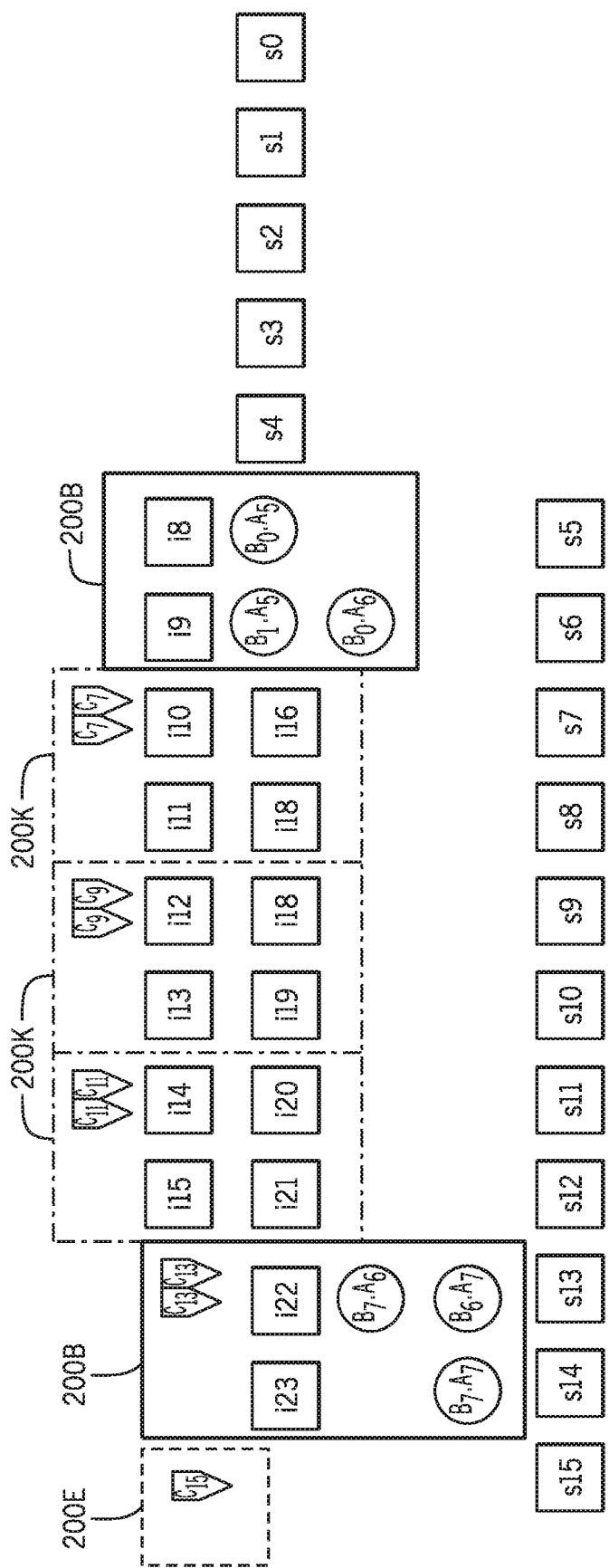
FIG. 21C is a illustrates a third stage of mapping of a 8×8 multiplication operation, in accordance with an embodiment.

FIG. 21A shows a first stage of an 8×8 multiplication operation in which the pattern 200A is used three times and pattern 200H is used once. In a second stage, as illustrated in FIG. 21B, pattern 200A and pattern 200B are used each four times, and pattern 200H is used twice. FIG. 21C illustrates a third stage of a 8×8 multiplication operation in which pattern 200B and pattern 200K are each used twice, and the pattern 200E is used once. As such, 8×8 multiplication operations can be performed using nineteen and one-half logic blocks 26 across three stages.

Figure 22A:
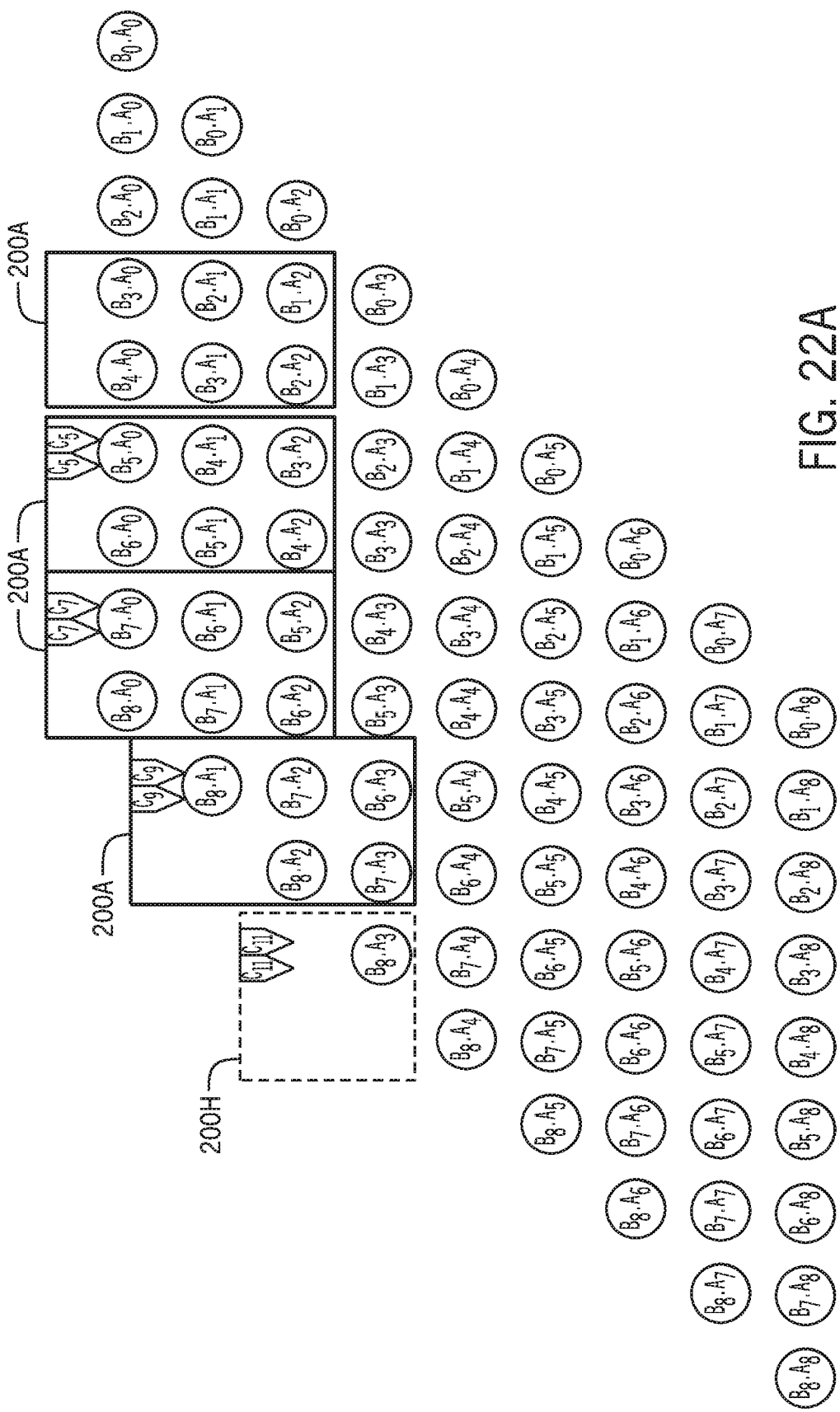
FIG. 22A is a illustrates a first stage of mapping of a 9×9 multiplication operation, in accordance with an embodiment.
Figure 22B:
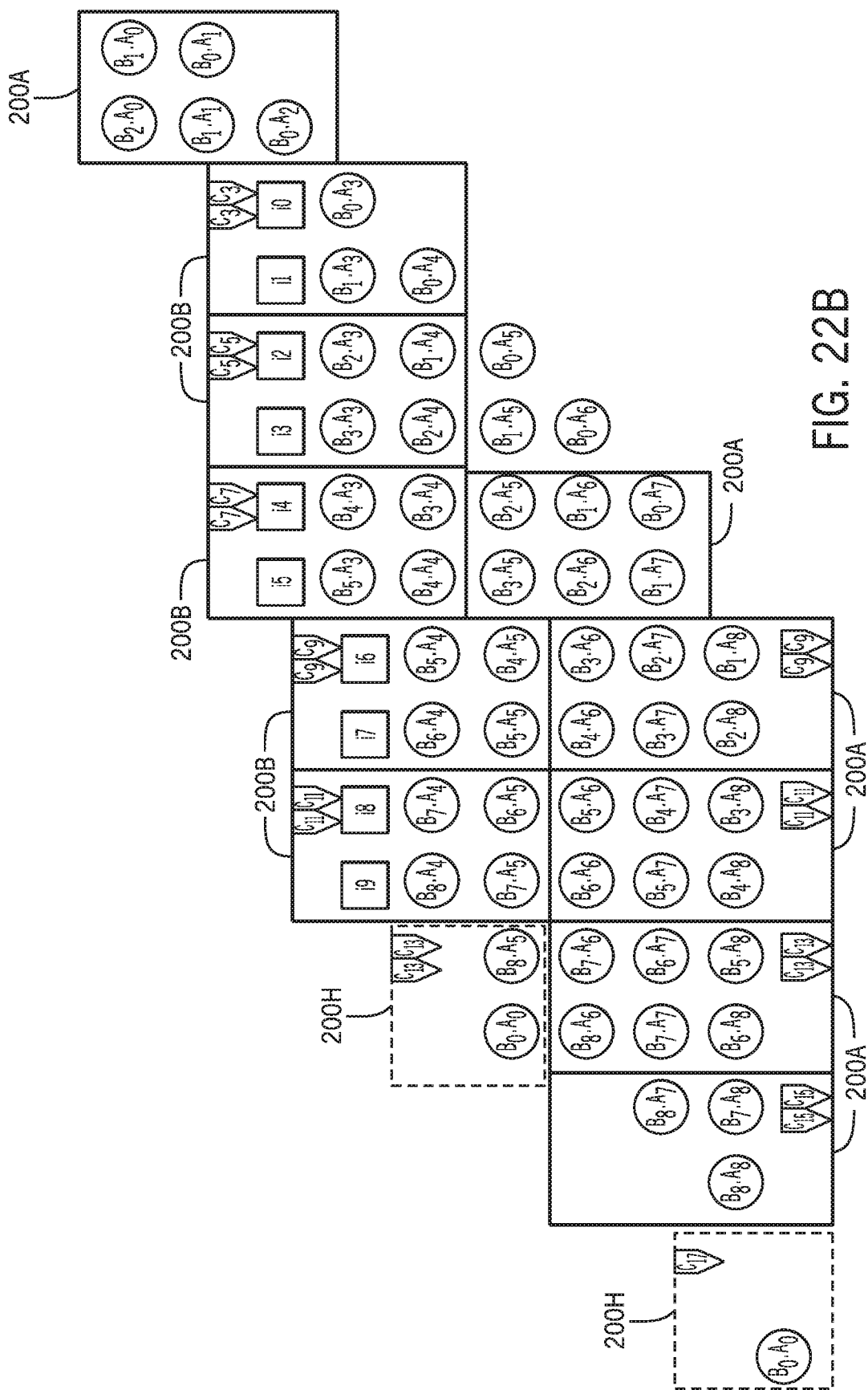
FIG. 22B is a illustrates a second stage of mapping of a 9×9 multiplication operation, in accordance with an embodiment.
Figure 22C:
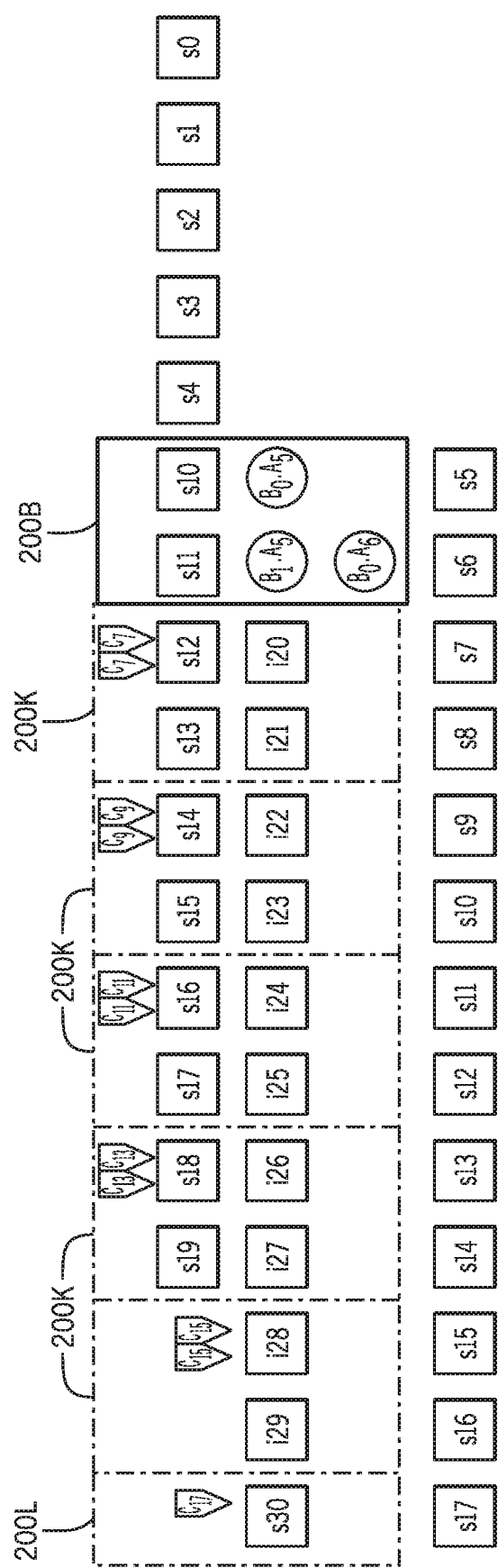
FIG. 22C is a illustrates a third stage of mapping of a 9×9 multiplication operation, in accordance with an embodiment.

FIG. 22A shows a first stage of a 9×9 multiplication operation in which the pattern 200A is used four times and the pattern 200H is used once. In a second stage, as illustrated in FIG. 22B, pattern 200A is used six times, pattern 200B is used five times, and pattern 200H is used twice. FIG. 22C illustrates a third stage of a 9×9 multiplication operation in which pattern 200B and pattern 200L are each used once, and pattern 200K is used five times. As such, 9×9 multiplication operations can be performed using twenty-four logic blocks 26 across three stages.

Figure 23:
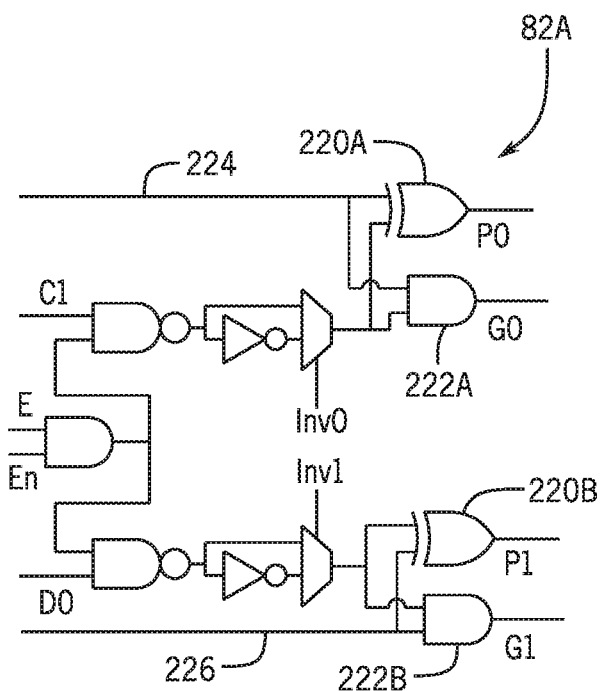
FIG. 23 is a schematic diagram of circuitry that may be included in the logic block of FIG. 3, in accordance with an embodiment.

Continuing with the drawings, FIG. 23 is a schematic diagram of circuitry 82A that can be used as an alternative to the circuitry 82 and the adders 90A, 90B illustrated in FIG. 3. More specifically, compared to the circuitry 82 illustrated in FIG. 3, in FIG. 19, the adders 90A, 90B have been replaced with XOR gates 220A, 220B and AND gates 222A, 222B that enables circuitry 82A to generate propagating and generating signals that can be used, for example, with carry-propagate adders. Additionally, the XOR gate 220A may receive an input from the adding circuitry 80 via line 224, and the AND gate 222B may receive an input from the adding circuitry via line 226.

Figure 24:
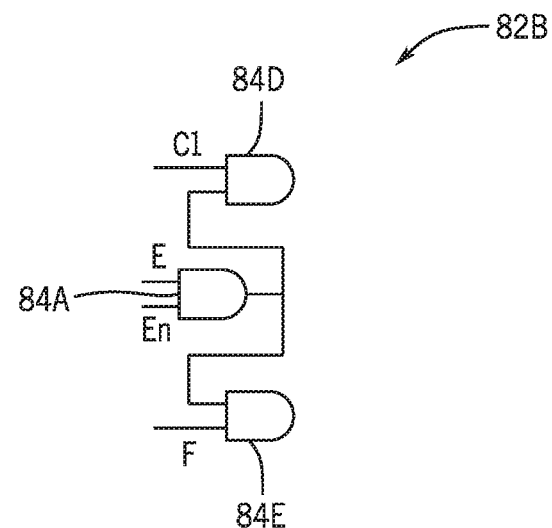
FIG. 24 is a schematic diagram of circuitry that may be included in the logic block of FIG. 3, in accordance with an embodiment.

Somewhat similarly, FIG. 24 is a schematic diagram of circuitry 82B that can be used as an alternative to the circuitry 82 included in FIG. 3. More specifically, compared to the circuitry 82 of FIG. 3, the NOT gates 86 and multiplexers 88 are not included, and the gates 84B, 84C (e.g., NAND gates) have been replaced with gates 84D, 84E (e.g., AND gates). Additionally, while inputs for gate 84D are the same as the gate 84B, gate 84E has inputs of the output of gate 84A and input F compared to the output of gate A and input E for the gate 84C of the circuitry 82 of FIG. 3. The circuitry 82C may be used, for example, if the logic block 26 is used for unsigned multiplication. Additionally, it should be noted that, in some embodiments, input D0 may be utilized instead of input F.

Before proceeding to discuss another embodiment of the logic block 26, it should be noted that the logic block 26A (and logic block 26B discussed below) may be utilized to add three two-bit numbers together. The bits of one number may be provided as inputs D0 and C1, the bits of another number may be C0 and B, and the bits of the last number may be A and D1. Additionally, input E may be set to "1."

Figure 25:
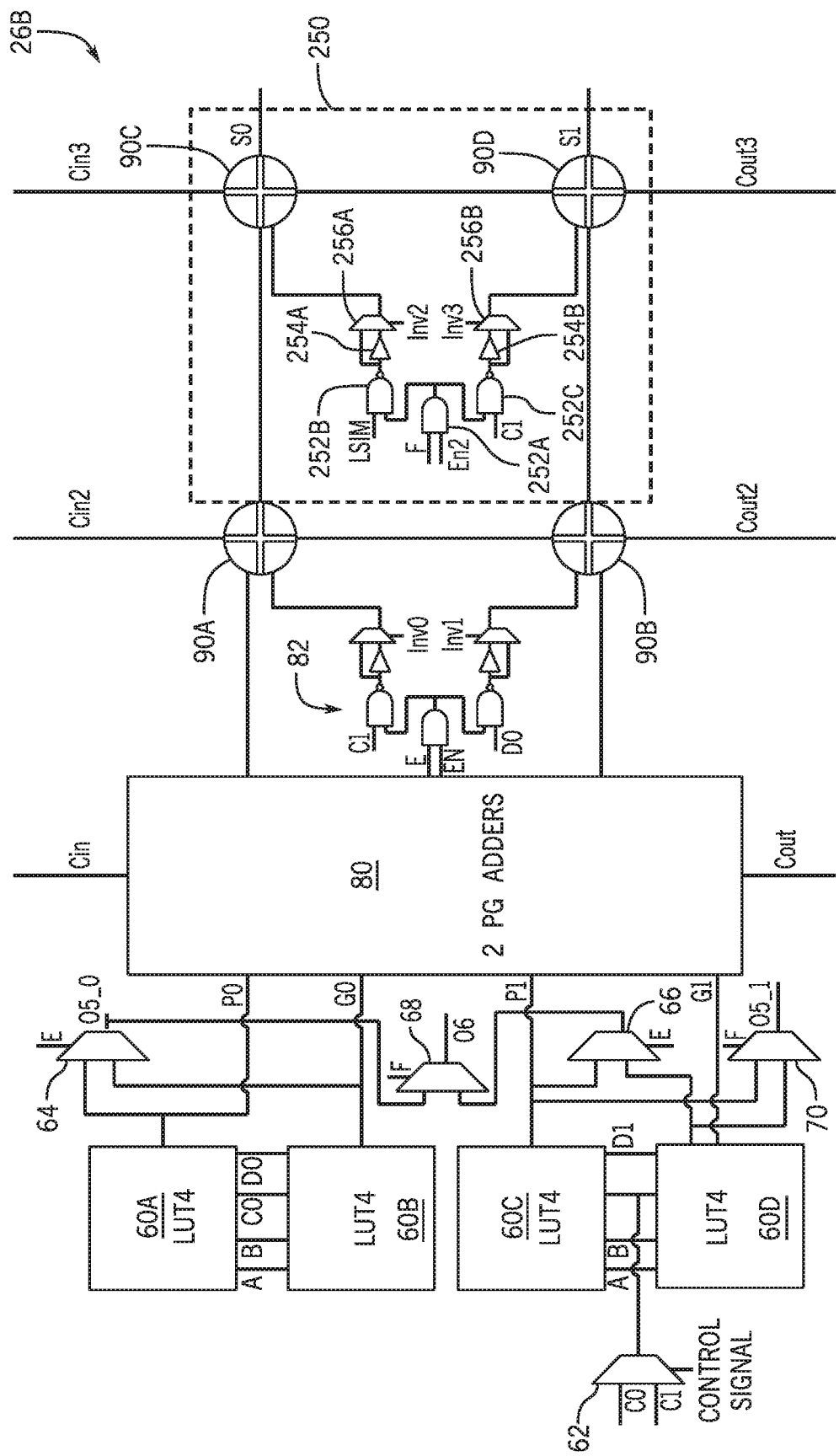
FIG. 25 is a schematic diagram of a logic block that can be implemented on the integrated circuit device of FIG. 1, in accordance with an embodiment.

Continuing with the drawings, FIG. 25 is a schematic diagram of a logic block 26B. The logic block 26B is generally similar to the logic block 26A, but the logic block 26B includes additional circuitry 250 as well as an additional carry line (e.g., Cin3, Cout 3). The additional circuitry 250 includes gates 252 (e.g., AND gate 252A and NAND gates, 252B, 252C), gates 254 (e.g., NOT gates 254A, 254B), multiplexers 256 (e.g., multiplexers 256A, 256B), and adders 90C, 90D. By including the additional circuitry 250, the logic block 26B is able to use nine input bits to generate and reduce eight partial products using two non-carry outputs (e.g., S0 and S1) and up to three carry outputs (e.g., Cout, Cout2, Cout3).

The gate 252A may receive input F and an input En2. Similar to input En, input En2 may be an enable/disable signal provided by the integrated circuit device 12 to disable the additional circuitry 250 when the additional circuitry 250 is not used. For example, by disabling the additional circuitry 250, power usage that may otherwise be caused by toggling signals may be reduced or eliminated. The gate 252A may generate an output, which may be used as an input for both of the gates 252B, 252C. The gate 252B may also receive input LSIM and output a value (e.g., that is provided to NOT gate 254A and multiplexer 256A), and the gate 252C may also receive input C1 and output a value (e.g., that is provided to a logical NOT gate 254B and a multiplexer 256B). The multiplexers 256A, 256B may receive inverter signals (e.g., Inv2 for multiplexer 256A and Inv3 for multiplexer 256B) from the integrated circuit device 12 and be utilized when performing signed multiplication. Furthermore, while the embodiment illustrated in FIG. 3 includes programmable inverters ((e.g., Inv2 and Inv3) of FIG. 25)) other types of inverters may be utilized in other embodiments.

Adder 90A may receive an output from the adder 90A, an output from the multiplexer 256A, and a carry-in value Cin3 to produce a value S0 and a carry out value. The carry-in value Cin3 may be a carry-out value generated by another logic block 26 (e.g., logic block 26B). The adder 90D may receive the carry out value from the adder 90C, an output from the adder 90B, and an output from the multiplexer 256B to determine a value S1 and a carry-out value Cout3.

Figure 26:
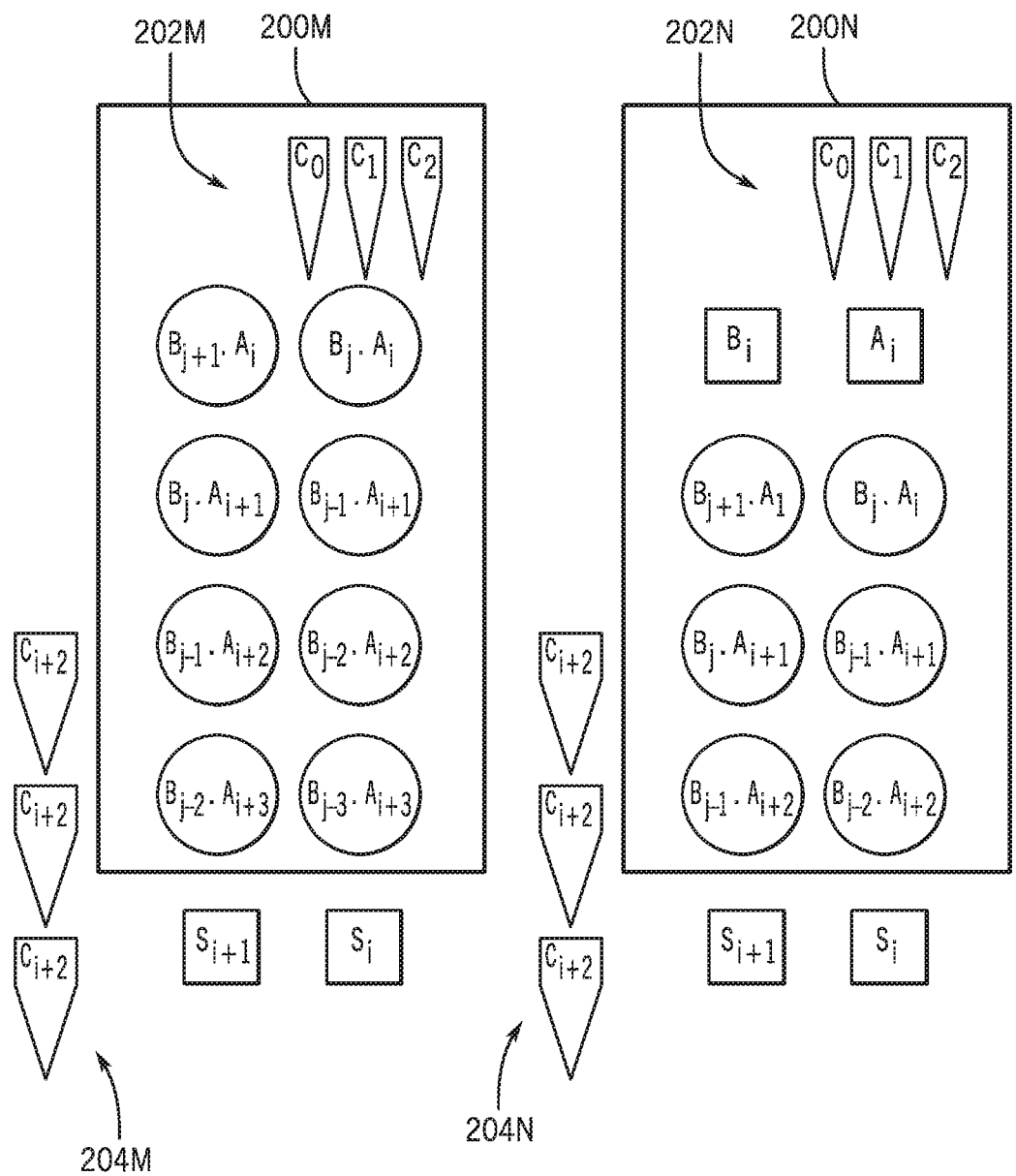
FIG. 26 illustrates two patterns associated with multiplication operations, in accordance with an embodiment.

As noted above, the logic block 26B can generate and reduce eight partial products. To do so, the logic block 26B may utilize patterns 200M, 200N illustrated in FIG. 26. The patterns 200M, 200N respectively include symbols 202M, 202N that can be used and/or determined by a single logic block 26 (e.g., logic block 26B) to generate outputs 204M, 204N, which may each include up to two non-carry bits and up to three carry bits. For example, carry-in (e.g., values received via Cin, Cin2, Cin3 in FIG. 25) values may be utilized, while partial products may be generated. For instance, in pattern 200M, three carry-in values may be received, eight partial products may be determined (based on values of bits of inputs A and B), and the output 204M that includes up to two non-carry bits and up to three carry bits may be generated. For the pattern 200N, three carry-in bits and two non-carry bits may be received, six partial products may be generated, and output 204 that includes up to two non-carry bits and up to three carry bits is generated. Table 5 is provided below to indicate how inputs A and B may be routed using the logic block 26B.

TABLE 5

| Input on logic block 26 in FIG. 3 | Input Value |
|---|---|
| A | $A_i$ |
| B | $A_{i+1}$ |
| C0 | $B_j$ |
| D0 | $B_{j-1}$ |
| D1 | $B_{j+i}$ |
| C1 | $B_{j-2}$ |
| E | $A_{i+2}$ |
| F | $A_{i+3}$ |
| LSIM | $B_{i-3}$ |

Additionally, it should be noted that any patterns 200 discussed above with respect to the logic block 26A may be used with the logic block 26B in the same manner as described above with respect to logic block 26A. Moreover, patterns 200M, 200N may respectively be utilized to perform multiplication operations (e.g., generating partial products) described above with respect to patterns 200A, 200B. Bearing this in mind, mappings that can be utilized to perform N×N multiplication operations using the logic block 26B will now be discussed.

The logic block 26B may perform N×N multiplication operations in which N is equal to two or three (i.e., 2×2 and 3×3 multiplication operations) using the pattern 200C and the mapping illustrated in FIG. 12, respectively. Accordingly, to perform 2×2 multiplication operations, a single logic block 26B may be used. Also, to perform a 3×3 multiplication operation, two and one-half logic blocks 26B may be used.

Figure 27:
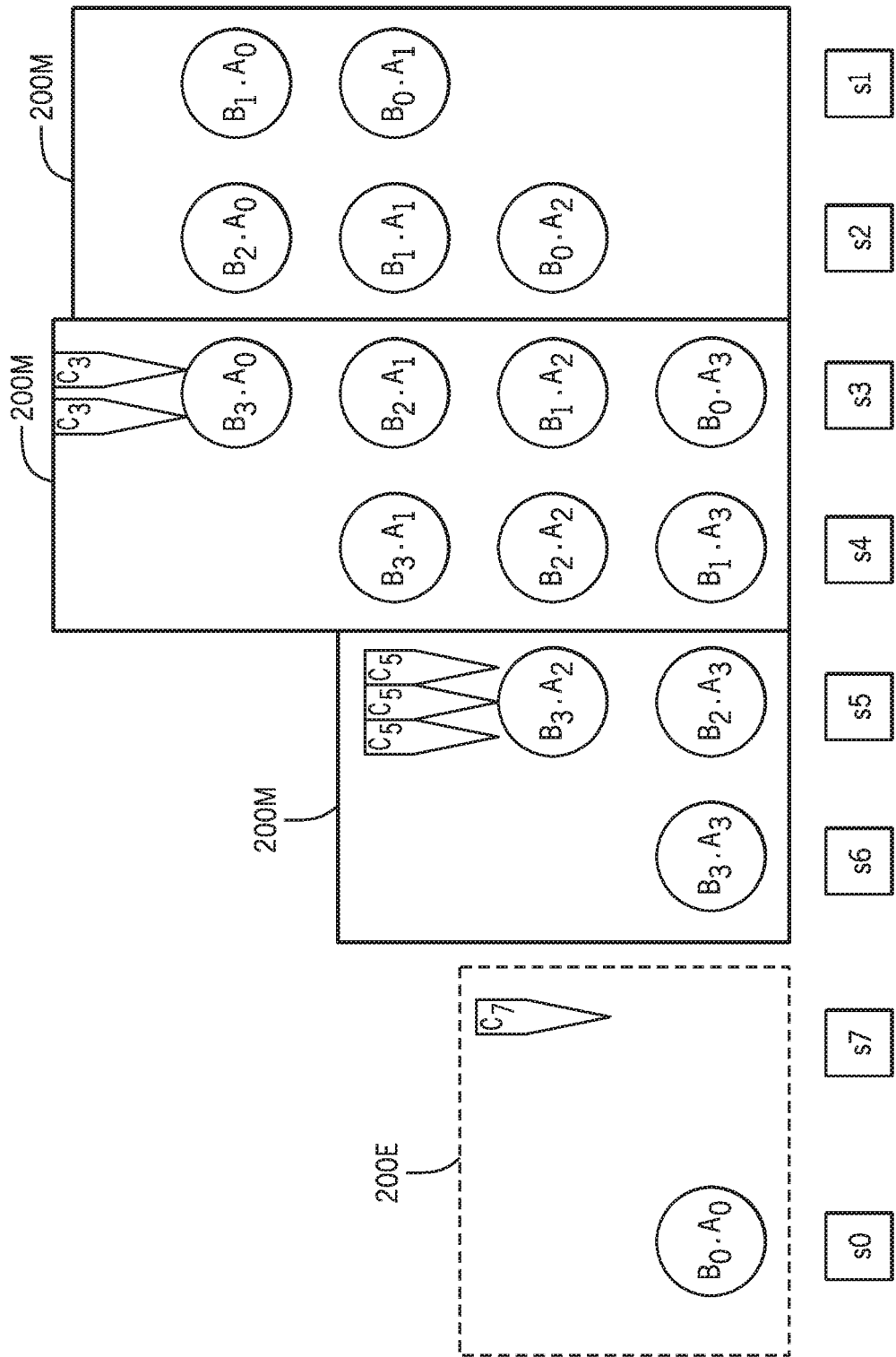
FIG. 27 illustrates a mapping of a 4×4 multiplication operation, in accordance with an embodiment.

FIG. 27 illustrates a mapping of a 4×4 multiplication operation. As illustrated, pattern 200M is used three times, and pattern 200E is used once. Accordingly, a total of three and one-half logic blocks 26B in a single stage may be utilized to carry out 4×4 multiplication operations.

Figure 28A:
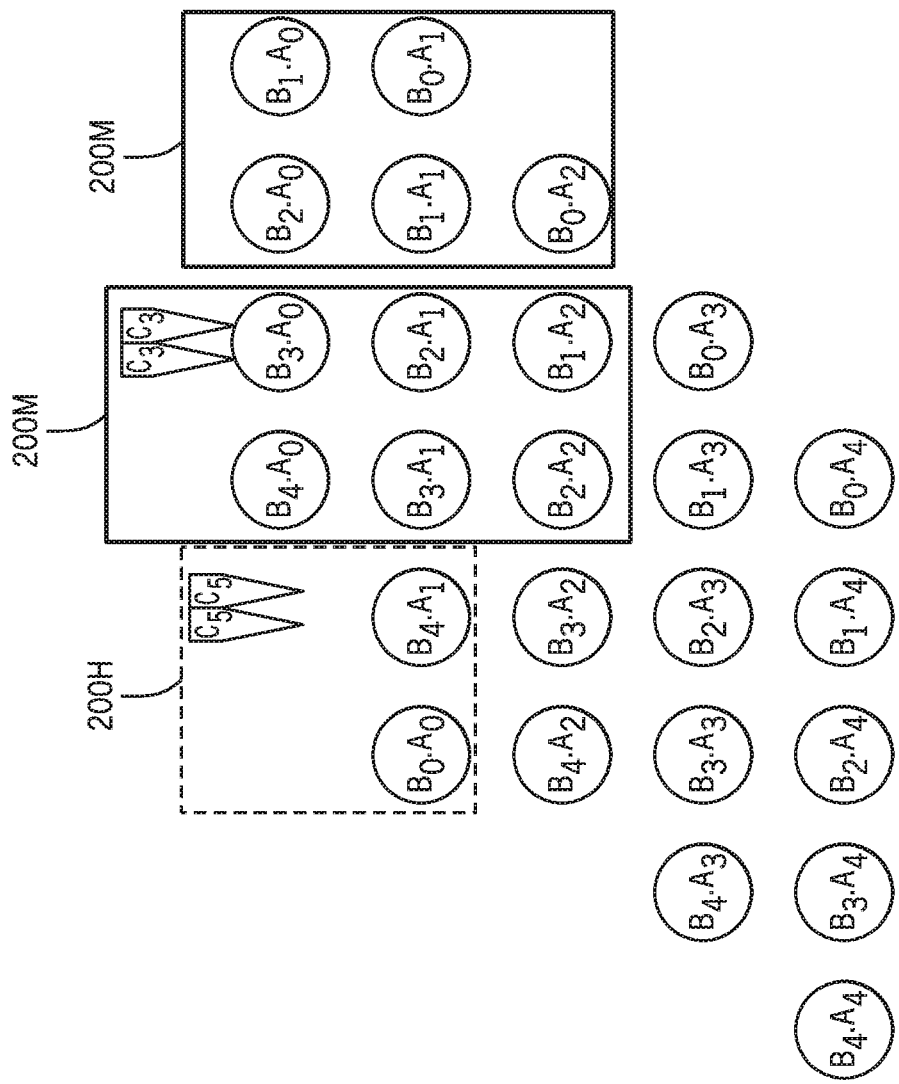
FIG. 28A illustrates a first stage of mapping of a 5×5 multiplication operation, in accordance with an embodiment.
Figure 28B:
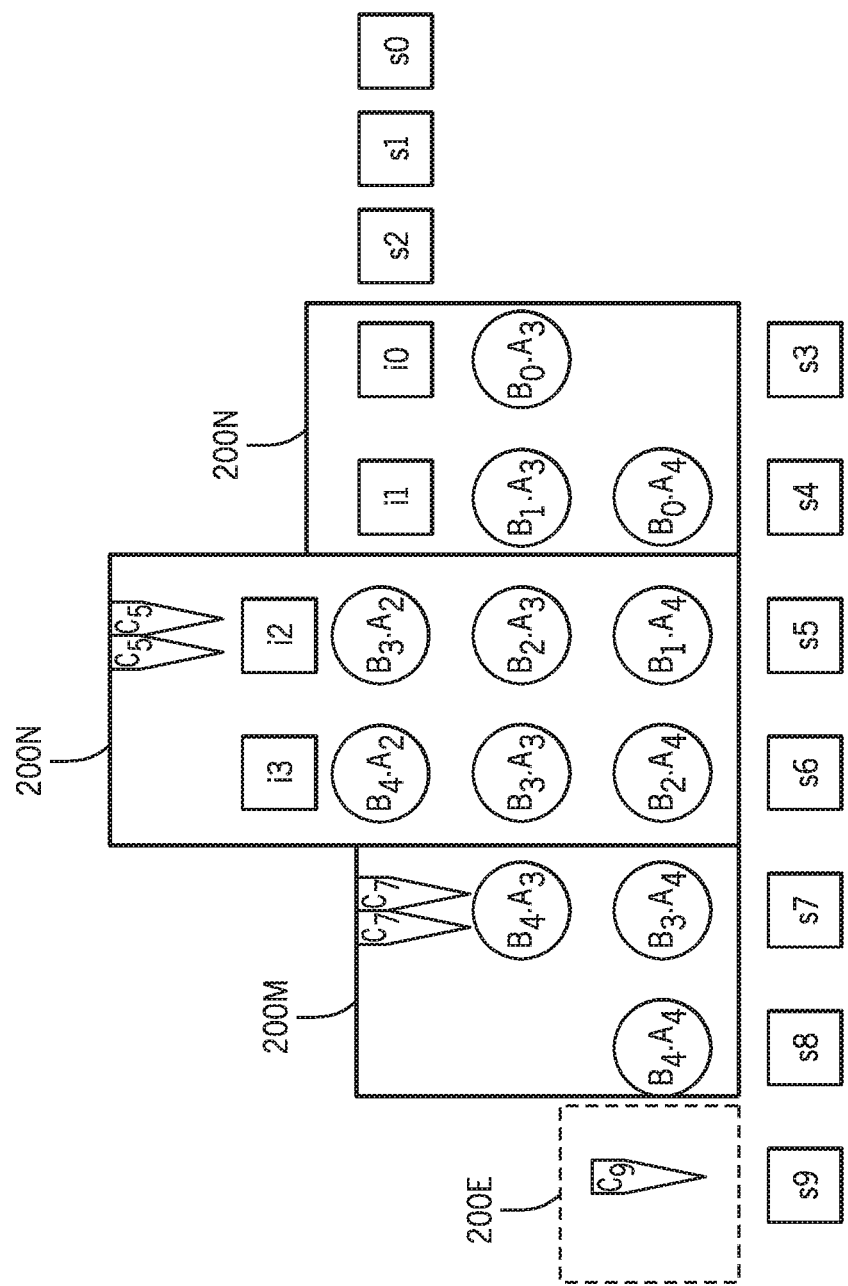
FIG. 28B illustrates a second stage of mapping of a 5×5 multiplication operation, in accordance with an embodiment.

FIG. 28A illustrates a first stage of a 5×5 multiplication operation in which the pattern 200M is used twice and pattern 200H is used once. As shown in FIG. 18B, partial products not generated during the first stage can be determined and summed with the bits (e.g., i0, i1, i2, i3) generated during a second stage using the pattern 200N twice, pattern 200M once, and pattern 200E once. Accordingly, 5×5 multiplication operations can be performed using six and one-half logic blocks 26B across two stages.

Figure 29A:
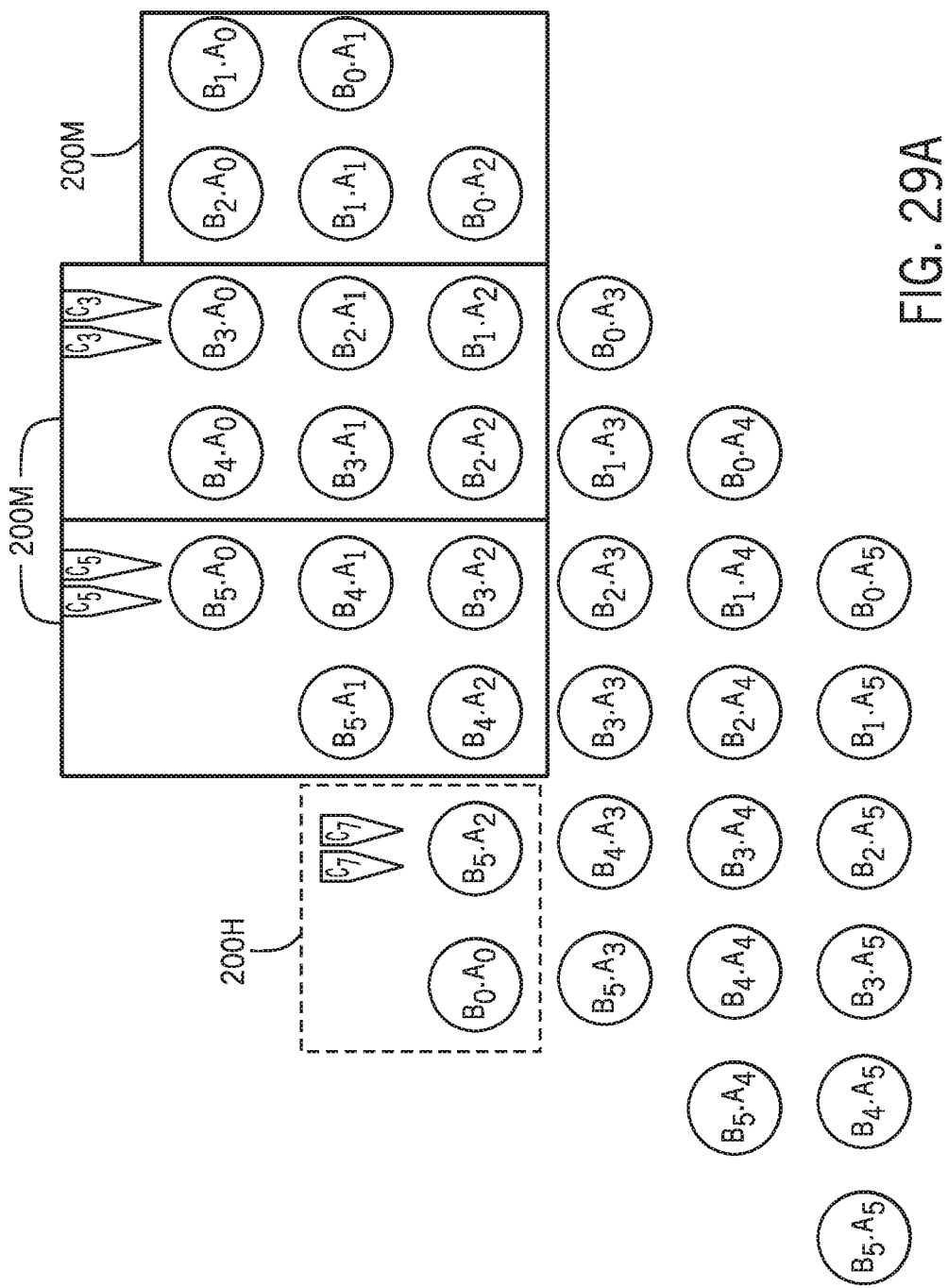
FIG. 29A illustrates a first stage of mapping of a 6×6 multiplication operation, in accordance with an embodiment.
Figure 29B:
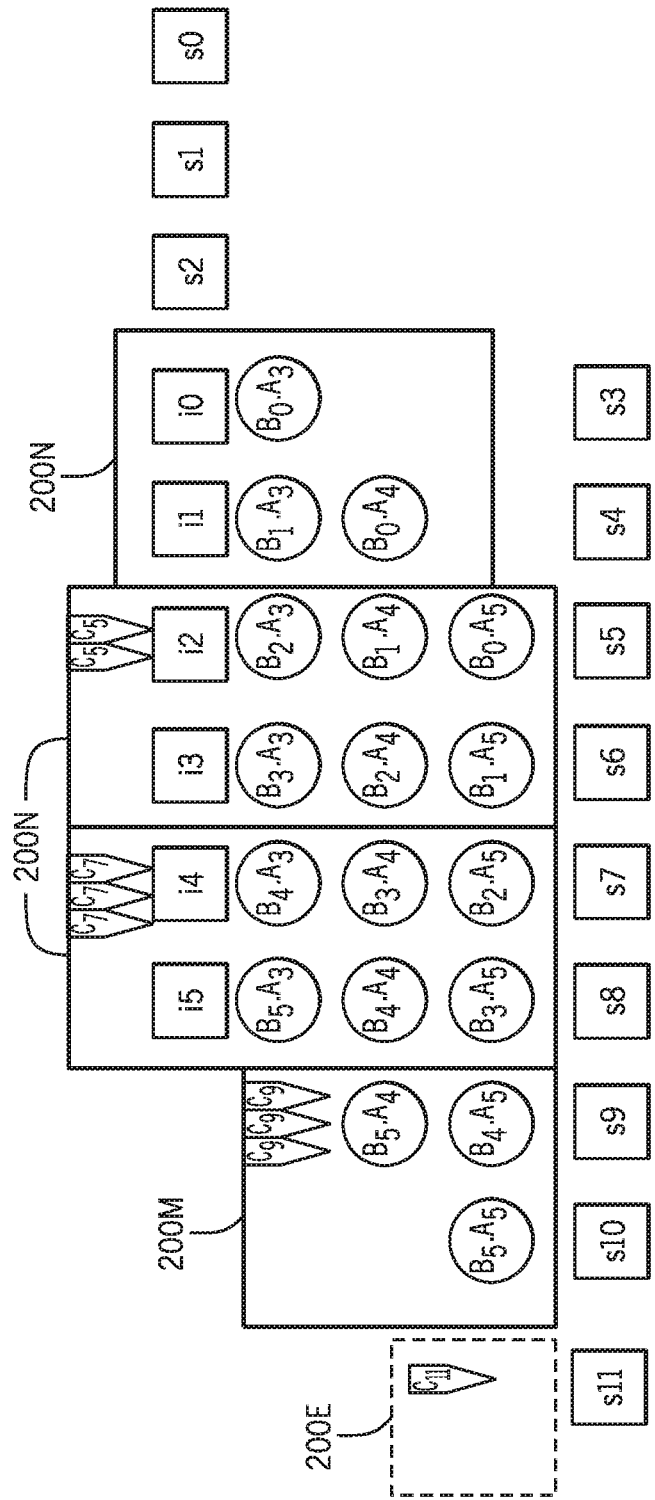
FIG. 29B illustrates a second stage of mapping of a 6×6 multiplication operation, in accordance with an embodiment.

FIG. 29A shows a first stage of a 6×6 multiplication operation in which the pattern 200M is used three times and pattern 200H is used once. In a second stage, as illustrated in FIG. 29B, pattern 200N may be used twice, and patterns 200E, 200M may each be used once. As such, 6×6 multiplication operations can be performed using eight and one-half logic blocks 26B across two stages.

Figure 30A:
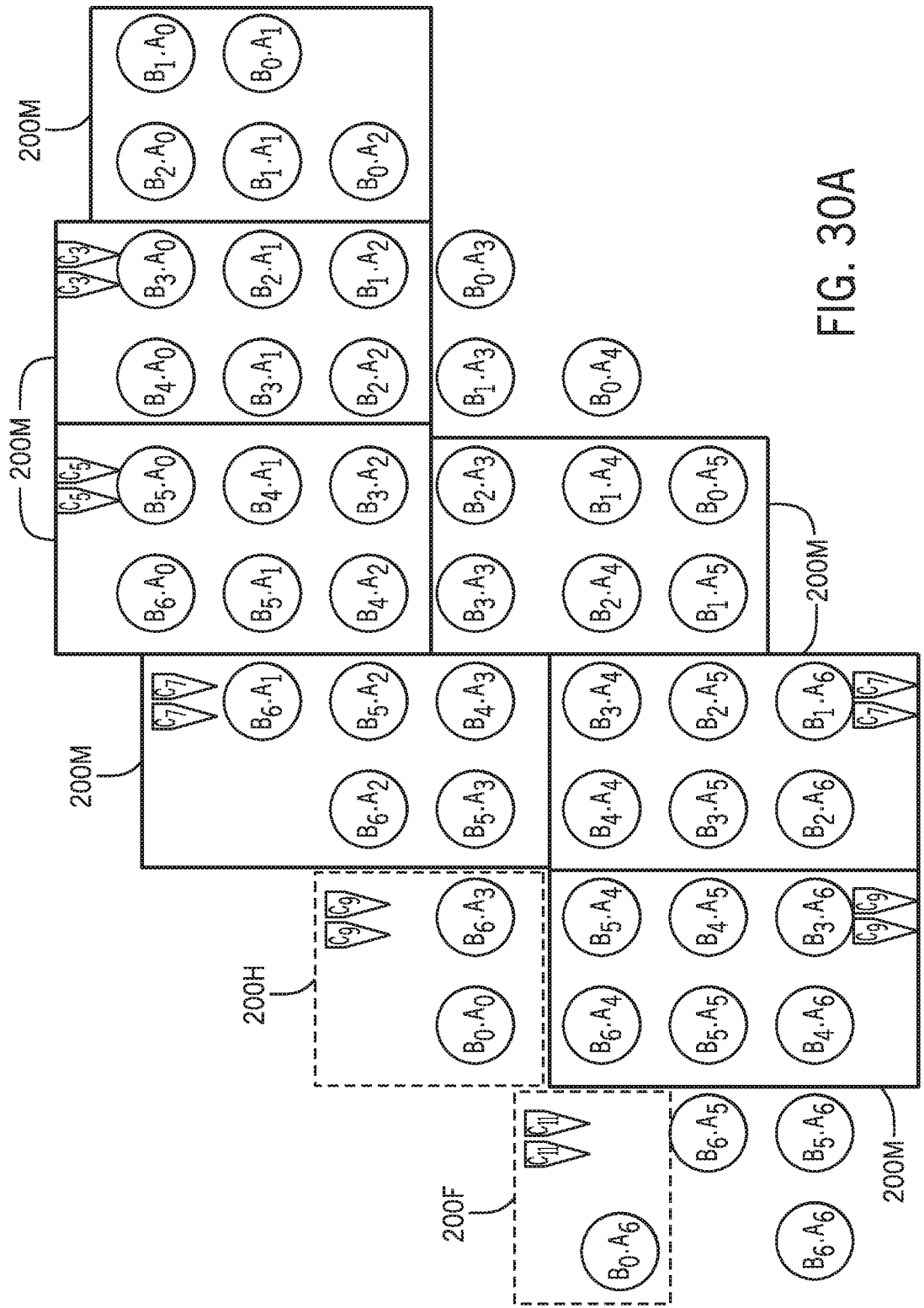
FIG. 30A illustrates a first stage of mapping of a 7×7 multiplication operation, in accordance with an embodiment.
Figure 30B:
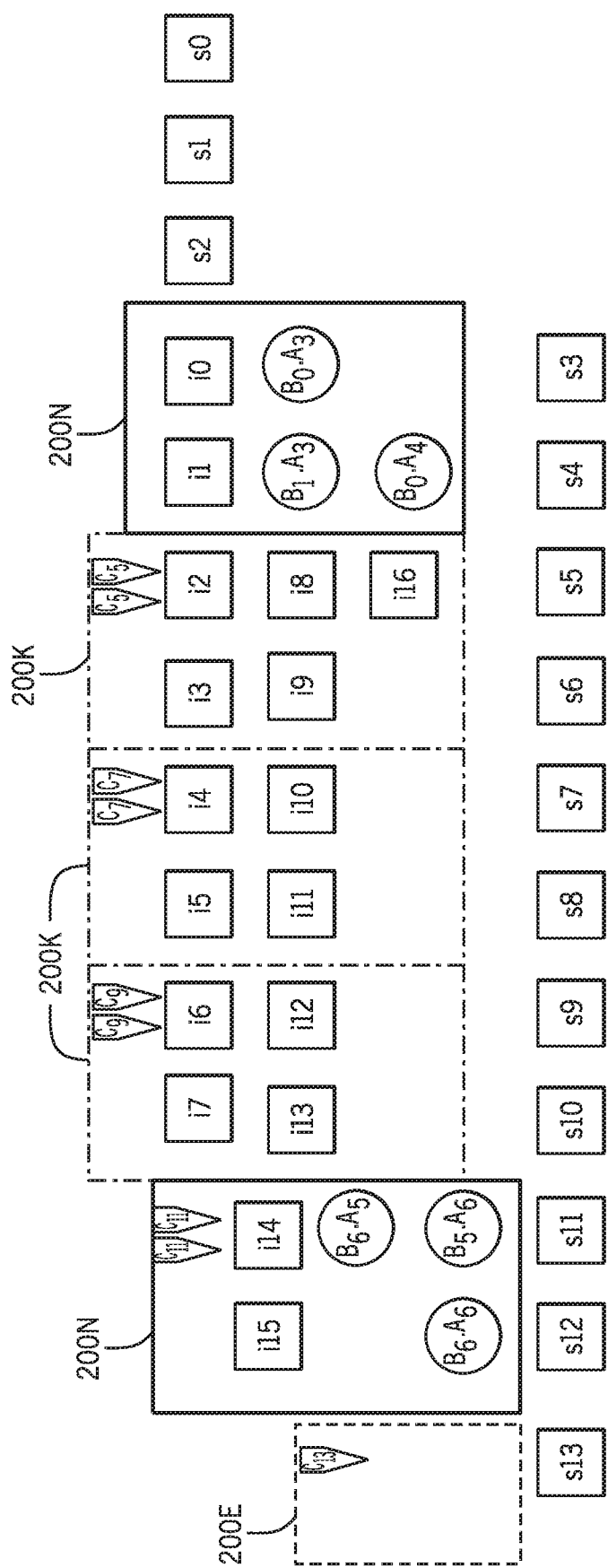
FIG. 30B illustrates a second stage of mapping of a 7×7 multiplication operation, in accordance with an embodiment.

FIG. 30A shows a first stage of a 7×7 multiplication operation in which the pattern 200M is used four times, and the pattern 220H is used once. In a second stage, as illustrated in FIG. 30B, pattern 200M is used four times, and pattern 200H is used twice. As such, 7×7 multiplication operations can be performed using ten logic blocks 26B across two stages.

Figure 31A:
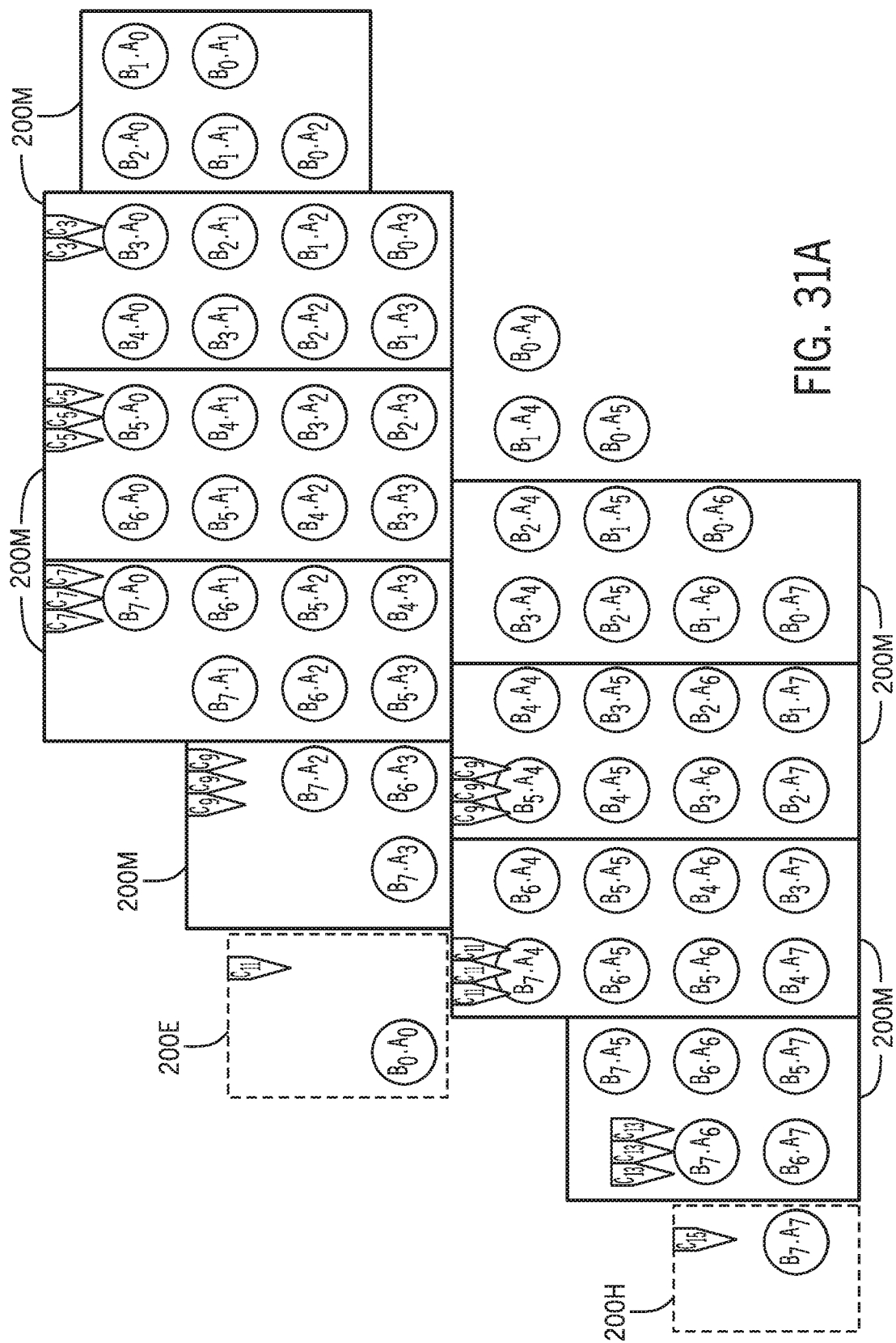
FIG. 31A illustrates a first stage of mapping of a 8×8 multiplication operation, in accordance with an embodiment.
Figure 31B:
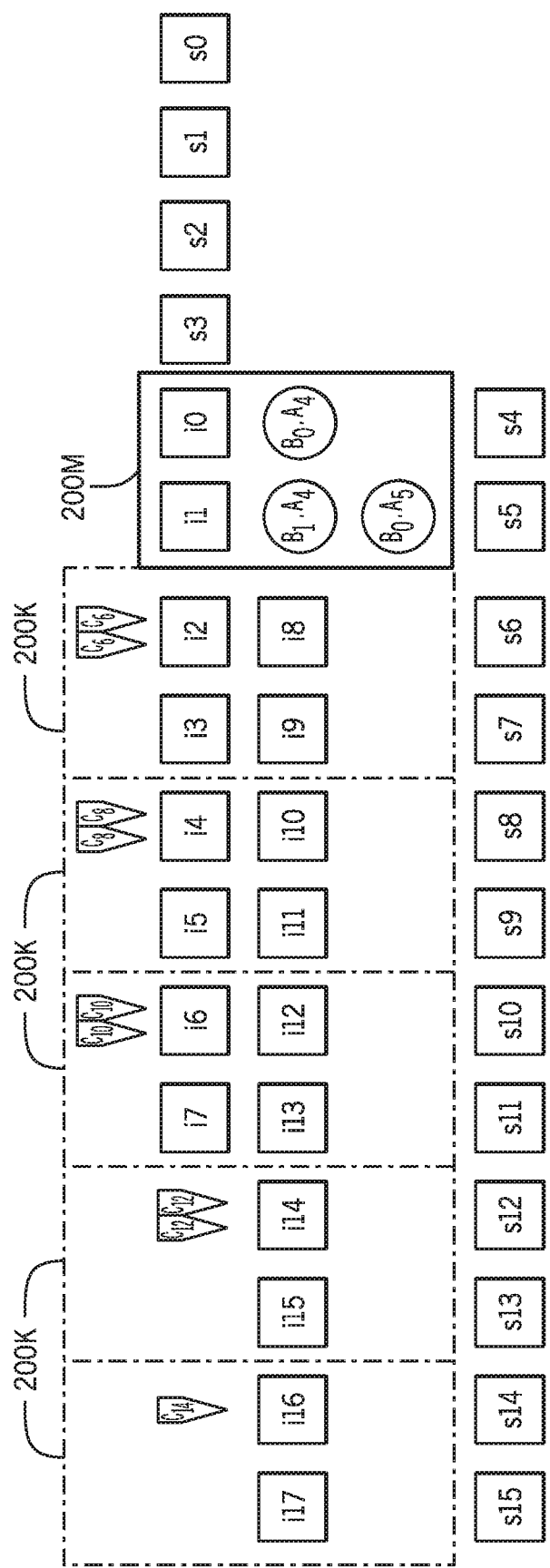
FIG. 31B illustrates a second stage of mapping of a 8×8 multiplication operation, in accordance with an embodiment.

FIG. 31A shows a first stage of an 8×8 multiplication operation in which the pattern 200M is used nine times, pattern 200E is used once, and pattern 200H is used once. In a second stage, as illustrated in FIG. 31B, pattern 200M is used once, and pattern 200K is used three times. As such, 8×8 multiplication operations can be performed using sixteen and one-half logic blocks 26B across two stages.

Figure 32A:
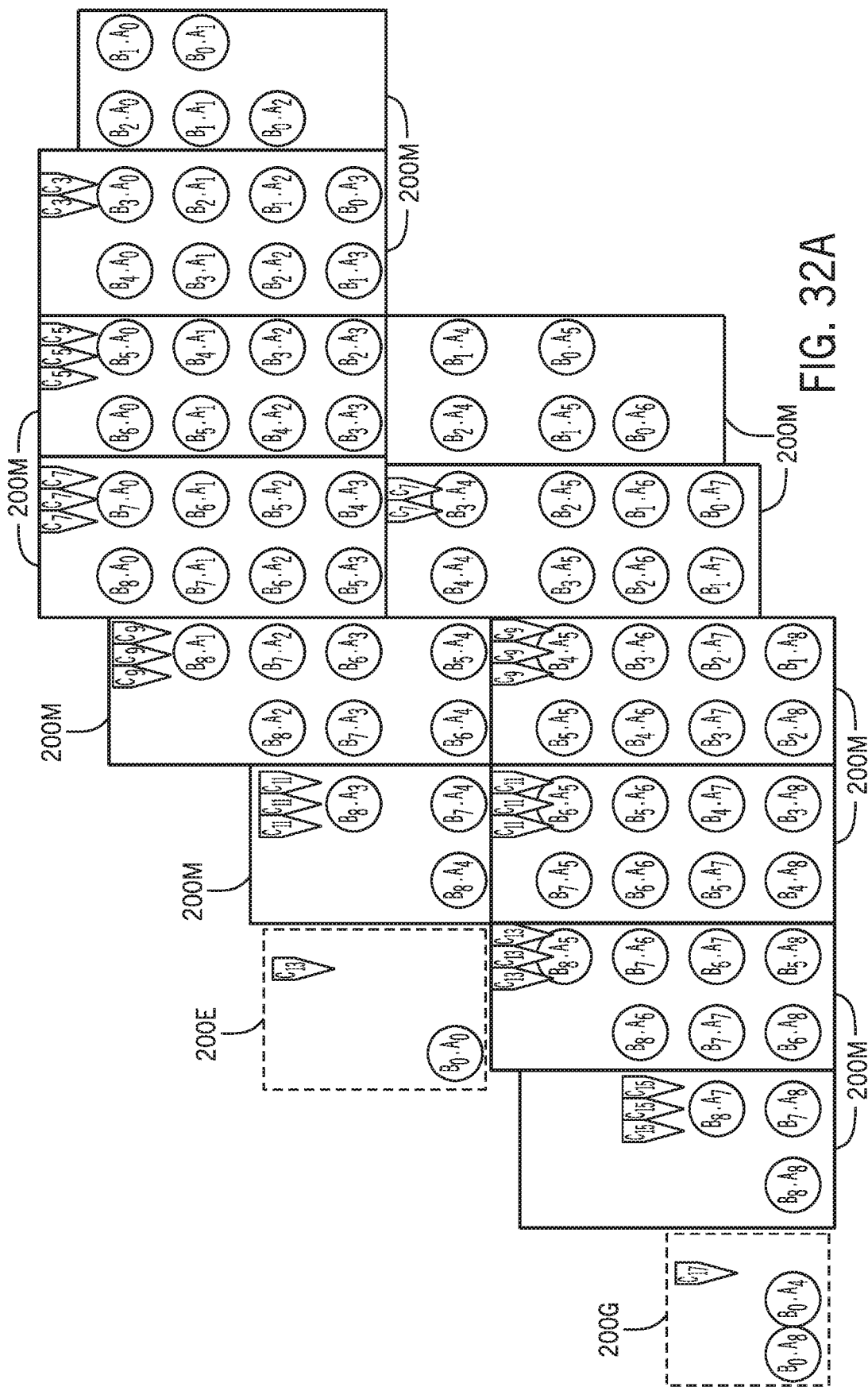
FIG. 32A illustrates a first stage of mapping of a 9×9 multiplication operation, in accordance with an embodiment.
Figure 32B:
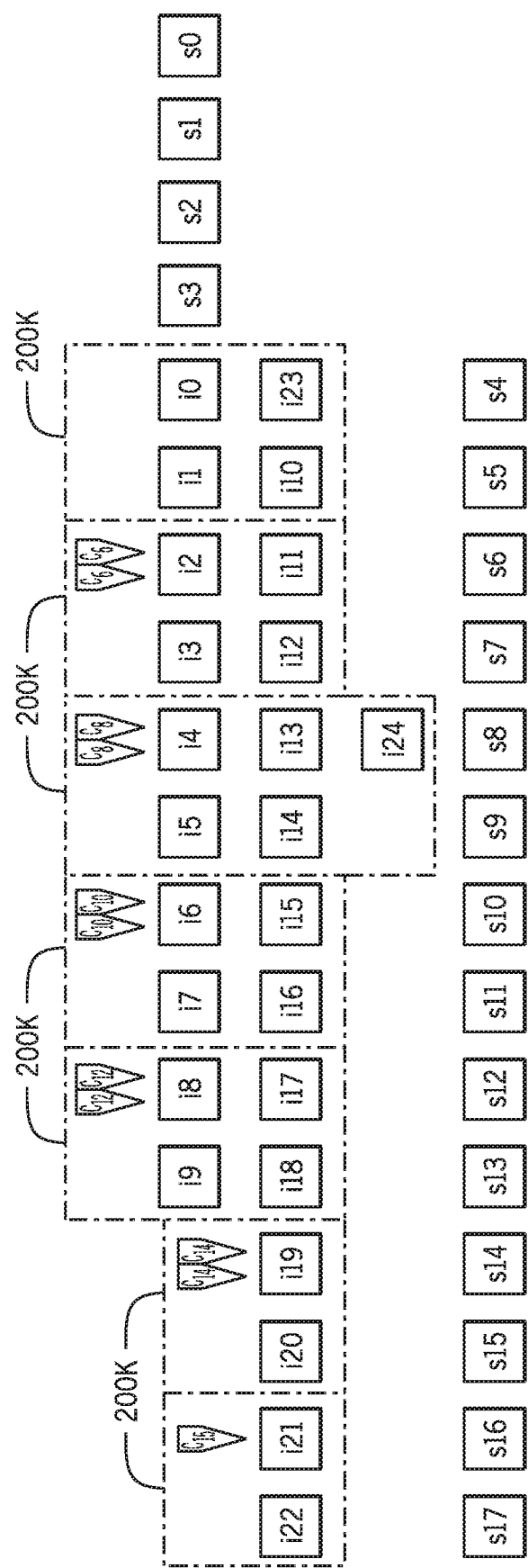
FIG. 32B illustrates a second stage of mapping of a 9×9 multiplication operation, in accordance with an embodiment.

FIG. 32A shows a first stage of a 9×9 multiplication operation in which the pattern 200M is used twelve times, pattern 200E is used once, and pattern 200G is used once. In a second stage, as illustrated in FIG. 32B, pattern 200K is used seven times. As such, 9×9 multiplication operations can be performed using twenty and one-half logic blocks 26B across two stages.

It should be noted that because each of the mappings discussed above with respect to the logic block 26B utilize either one or two stages, the mappings use the fewest number of logic blocks 26B and stages. To help summarize the mappings provided herein for the logic block 26A and the logic block 26B, Table 6 is provided.

TABLE 6

| Multiplication Operation | Number of Logic Blocks 26A for lowest number of logic blocks (number of stages) | Number of Logic Blocks 26A for lowest number of stages (number of stages) | Number of Logic Blocks 26B (number of stages) |
|---|---|---|---|
| 2 × 2 | 1 (1) | 1 (1) | 1 (1) |
| 3 × 3 | 2.5 (1) | 2.5 (1) | 2.5 (1) |

TABLE 6-continued

| Multiplication Operation | Number of Logic Blocks 26A for lowest number of logic blocks (number of stages) | Number of Logic Blocks 26A for lowest number of stages (number of stages) | Number of Logic Blocks 26B (number of stages) |
|---|---|---|---|
| 4 × 4 | 4.5 (2) | 4.5 (2) | 3.5 (1) |
| 5 × 5 | 7 (2) | 7 (2) | 6.5 (2) |
| 6 × 6 | 10 (3) | 11.5 (2) | 8.5 (2) |
| 7 × 7 | 13.5 (3) | 14.5 (2) | 10 (2) |
| 8 × 8 | 19.5 (3) | 20.5 (2) | 16.5 (2) |
| 9 × 9 | 24 (3) | 25.5 (2) | 20.5 (2) |

The technical effects of the techniques discussed herein enable limited space on integrated circuit devices to be more efficiently utilized by including high density circuitry that can be used to perform multiplication operations. For example, the logic blocks 26 discussed herein enable many multiplication operations to be performed simultaneously. Furthermore, reduced amounts of stages may be used to perform certain multiplication operations. Accordingly, the techniques described herein enable integrated circuits to perform multiplication operations quickly and efficiently.

Figure 33:
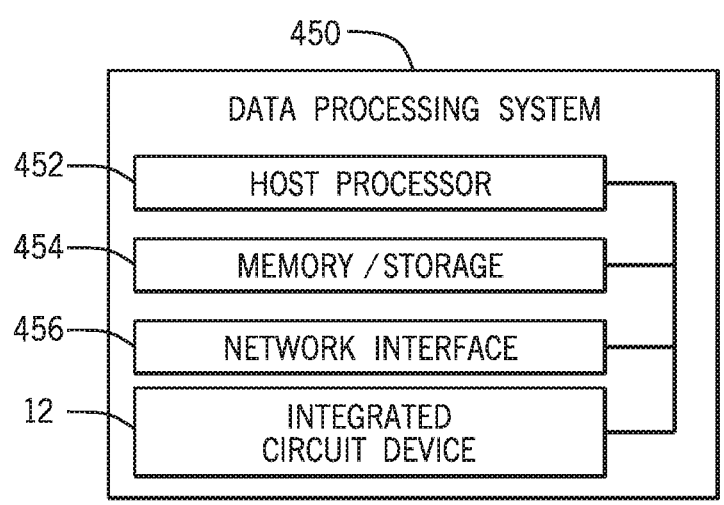
FIG. 33 is a block diagram of a data processing system, in accordance with an embodiment, in accordance with an embodiment.

The integrated circuit device 12 be a data processing system or a component of a data processing system. For example, the integrated circuit device 12 may be a component of a data processing system 450, shown in FIG. 33. The data processing system 450 may include a host processor 452, memory and/or storage circuitry 454, and a network interface 456. The data processing system 450 may include more or fewer components (e.g., electronic display, user interface structures, application specific integrated circuits (ASICs)). The host processor 452 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 450 (e.g., to perform encryption, decryption, machine learning, video processing, voice recognition, image recognition, data compression, database search ranking, bioinformatics, network security pattern identification, spatial navigation, or the like). The memory and/or storage circuitry 454 may include random access memory (RAM), read-only memory (ROM), one or more hard drives, flash memory, or the like. The memory and/or storage circuitry 454 may hold data to be processed by the data processing system 450. In some cases, the memory and/or storage circuitry 454 may also store configuration programs (bitstreams) for programming the integrated circuit device 12. The network interface 456 may allow the data processing system 450 to communicate with other electronic devices. The data processing system 450 may include several different packages or may be contained within a single package on a single package substrate.

In one example, the data processing system 450 may be part of a data center that processes a variety of different requests. For instance, the data processing system 450 may receive a data processing request via the network interface 456 to perform encryption, decryption, machine learning, video processing, voice recognition, image recognition, data compression, database search ranking, bioinformatics, network security pattern identification, spatial navigation, or some other specialized task. The host processor 452 may cause the programmable logic fabric of the integrated circuit device 12 to be programmed with circuitry suitable to implement a requested task. For instance, the host processor 452 may instruct that a configuration data (bitstream) stored on the memory and/or storage circuitry 454 to be programmed into the programmable logic fabric of the integrated circuit device 12. The configuration data (bitstream) may represent a circuit design for performing multiplication operations that utilize one or more of the logic blocks 26, which may be mapped to the programmable logic according to the techniques described herein. As such, the integrated circuit device 12 may assist the data processing system 450 in performing the requested task, such as performing multiplication operations.

While the embodiments set forth in the present disclosure may be susceptible to various modifications and alternative forms, specific embodiments have been shown by way of example in the drawings and have been described in detail herein. For example, any suitable combination of the embodiments and/or techniques described herein may be implemented. Moreover, any suitable combination of number formats (e.g., single-precision floating-point, half-precision floating-point, bfloat16, extended precision and/or the like) may be used. Further, each DSP circuitry and/or DSP architecture may include any suitable number of elements (e.g., adders, multipliers 64, routing, and/or the like). Accordingly, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An integrated circuit, comprising a logic block configurable to perform multiplication operations, wherein the logic block comprises:
   a plurality of lookup tables configurable to receive a plurality of inputs and generate a first plurality of outputs, wherein a first portion of the plurality of lookup tables is configurable to receive a first bit value of the plurality of inputs;
   a multiplexer communicatively coupled to a second portion of the plurality of lookup tables that is different than the first portion of the plurality of lookup tables, wherein the multiplexer is configurable to:
      receive the first bit value of the plurality of inputs, a second bit value of the plurality of inputs, and a control signal; and
      provide either the first bit value or the second bit value to the second portion of the plurality of lookup tables based on the control signal;
   adding circuitry configurable to receive the first plurality of outputs and generate a second plurality of outputs; and
   circuitry configurable to receive a portion of the plurality of inputs, determine one or more partial products, and generate a third plurality of outputs.

2. The integrated circuit of claim 1, further comprising a first adder configurable to determine a sum of a first portion of the second plurality of outputs and a first portion of the third plurality of outputs.

3. The integrated circuit of claim 2, further comprising additional circuitry configurable to:
receive the portion of the plurality of inputs and the sum; and
determine a second sum of the portion of the plurality of inputs and the sum.

4. The integrated circuit of claim 3, wherein the logic block is configurable to generate eight partial products.

5. The integrated circuit of claim 3, wherein:
the adding circuitry is configurable to receive a first carry-in value from a second logic block;
the circuitry is configurable to generate a second carry-in value from the second logic block; and
the additional circuitry is configurable to generate a third carry-in value from the second logic block.

6. The integrated circuit of claim 1, wherein the logic block is configurable to perform signed and unsigned multiplication operations.

7. The integrated circuit of claim 1, wherein the first portion of the plurality of lookup tables and the second portion of the plurality of lookup tables are configurable to receive a third bit value, and a fourth bit value of the plurality of inputs.

8. The integrated circuit of claim 1, wherein the integrated circuit comprises a programmable logic device.

9. The integrated circuit of claim 8, wherein the programmable logic device comprises a field-programmable gate array (FPGA).

10. The integrated circuit of claim 1, wherein the first plurality of outputs comprises four partial products generated based on the plurality of inputs.

11. The integrated circuit of claim 10, wherein the third plurality of outputs comprises two partial products.

12. The integrated circuit of claim 11, further comprising:
a first adder configurable to determine a first sum of a first portion of the second plurality of outputs and a first partial product of the two partial products; and
a second adder configurable to determine a second sum of a second portion of the second plurality of outputs and a second partial product of the two partial products.

13. A logic block implementable on a programmable logic device, the logic block comprising:
a plurality of lookup tables configurable to receive a plurality of inputs and generate a first plurality of outputs, wherein a first portion of the plurality of lookup tables is configurable to receive a first bit value of the plurality of inputs;
a multiplexer communicatively coupled to a second portion of the plurality of lookup tables that is different than the first portion of the plurality of lookup tables, wherein the multiplexer is configurable to:
receive the first bit value of the plurality of inputs, a second bit value of the plurality of inputs, and a control signal; and
provide either the first bit value or the second bit value to the second portion of the plurality of lookup tables based on the control signal;
adding circuitry configurable to receive the first plurality of outputs and generate a second plurality of outputs; and
circuitry configurable to receive a portion of the plurality of inputs, determine one or more partial products, and generate a third plurality of outputs.

14. The logic block of claim 13, wherein:
the plurality of inputs comprises a first input and second input, wherein the first input and the second input each comprise up to four bits; and
the logic block is configured to generate six partial products.

15. The logic block of claim 13, wherein the logic block further comprises an adder configured to receive a portion of the second plurality of outputs, a carry-in value from a second logic block communicatively coupled to the logic block, and a portion of the third plurality of outputs.

16. The logic block of claim 13, wherein:
the first portion of the plurality of lookup tables is configurable to receive a third bit value, a fourth bit value, and a fifth bit value of the plurality of inputs;
the second portion of the plurality of lookup tables is configurable to receive the third bit value, the fourth bit value, and a sixth bit value of the plurality of inputs; and
the circuitry is configurable to receive the second bit value or the fifth bit value of the plurality of inputs.

17. An integrated circuit device, comprising a plurality of logic blocks, wherein each logic block of the plurality of logic blocks comprises:
a plurality of lookup tables configurable to receive a plurality of inputs and generate a first plurality of outputs, wherein a first portion of the plurality of lookup tables is configurable to receive a first bit value of the plurality of inputs;
a multiplexer communicatively coupled to a second portion of the plurality of lookup tables that is different than the first portion of the plurality of lookup tables, wherein the multiplexer is configurable to:
receive the first bit value of the plurality of inputs, a second bit value of the plurality of inputs, and a control signal; and
provide either the first bit value or the second bit value to the second portion of the plurality of lookup tables based on the control signal;
adding circuitry configurable to receive the first plurality of outputs and generate a second plurality of outputs; and
circuitry configurable to receive at least a portion of the plurality of inputs, determine one or more partial products, and generate a third plurality of outputs.

18. The integrated circuit device of claim 17, wherein the circuitry is configurable to receive an enable/disable signal to disable the circuitry when the circuitry is not used.

19. The integrated circuit device of claim 17, wherein the plurality of logic blocks comprises a first logic block and a second logic block communicatively coupled to the first logic block, wherein:
the first logic block is configurable to generate two non-carry bits, a first carry bit, and a second carry bit; and
the adding circuitry of the second logic block is configurable to receive the first carry bit.

20. The integrated circuit device of claim 19, wherein the second logic block comprises an adder configurable to receive the second carry bit.

* * * * *